on this page.

United States Patent
Connelly et al.

(10) Patent No.: US 7,603,734 B2
(45) Date of Patent: Oct. 20, 2009

(54) SYSTEM AND METHOD FOR DETECTING RACK FAULT CONDITION OF PASSENGER BOARDING BRIDGE LIFT COLUMNS

(75) Inventors: Michael Robert Connelly, Kanata (CA); Neil Hutton, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 611 days.

(21) Appl. No.: 11/442,994

(22) Filed: May 31, 2006

(65) Prior Publication Data
US 2007/0277333 A1    Dec. 6, 2007

(51) Int. Cl.
*B64F 1/305* (2006.01)

(52) U.S. Cl. .............. 14/71.3; 14/69.5; 14/71.5
(58) Field of Classification Search .......... 14/69.5–71.5
See application file for complete search history.

(56) References Cited

U.S. PATENT DOCUMENTS

| | | | |
|---|---|---|---|
| 3,722,017 A * | 3/1973 | Gacs et al. ............... 14/71.5 |
| 5,226,204 A | 7/1993 | Schoenberger et al. |
| 5,867,950 A * | 2/1999 | Claisse .................. 52/125.6 |
| 6,724,314 B2 | 4/2004 | Hutton |
| 6,862,768 B2 * | 3/2005 | Hutton ................... 14/71.5 |
| 2006/0062637 A1 * | 3/2006 | Foo et al. ................ 405/198 |

* cited by examiner

Primary Examiner—Raymond W Addie
(74) Attorney, Agent, or Firm—Freedman & Associates

(57) ABSTRACT

A system for preventing a rack fault condition of a passenger boarding bridge includes a plurality of electromagnetic sensors that are disposed for sensing separately a rotational movement of each one of a first and a second electromechanical screw jack, one electromechanical screw jack located adjacent to each lateral sidewall surface of the passenger boarding bridge. The system also includes a control circuit in communication with the plurality of electromagnetic sensors. The control circuit receives signals from the sensors, which signals are indicative of the sensed rotational movement of each one of the first and second electromechanical screw jacks. A value is determined relating to a rotational synchronization of the first and second electromechanical screw jacks. When the determined value is outside a predetermined range of threshold values, a control signal is provided for affecting the rotational movement of at least one of the first and second electromechanical screw jacks.

24 Claims, 17 Drawing Sheets

US 7,603,734 B2

SYSTEM AND METHOD FOR DETECTING RACK FAULT CONDITION OF PASSENGER BOARDING BRIDGE LIFT COLUMNS

FIELD OF THE INVENTION

The instant invention relates generally to passenger boarding bridges, and more particularly to a system and method for detecting a rack fault condition in the electromechanical screw jacks of the type that are used for height adjustment of the passenger boarding bridge.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge in present day use includes a plurality of adjustable modules, including: a rotunda, a telescopic tunnel, a bubble section, an aircraft-engaging cabin, and elevating lift columns with wheel carriage. Typically, one lift column is mounted adjacent to each lateral surface of the telescopic tunnel. Other common types of passenger boarding bridges include radial drive bridges and over-the-wing (OTW) bridges. These types of passenger boarding bridges are adjustable, for instance to compensate for different sized aircraft and to compensate for imprecise parking of aircraft at an airport terminal.

The lift columns are for adjusting the height of the passenger boarding bridge, so as to position the cabin at a proper height above the ground for engaging a doorway of an aircraft. After the cabin is aligned with the doorway, the lift columns are used to support the passenger boarding bridge in such a way that an approximately level walking surface is maintained between the doorway of the aircraft and the cabin of the passenger boarding bridge. In particular, the aircraft rises and lowers on its undercarriage as it is first unloaded of passengers, baggage and cargo, and then reloaded and fueled for the next flight. For this reason, passenger boarding bridges typically are equipped with autolevel mechanisms for sensing vertical movement of the aircraft and for automatically adjusting the height of the cabin. Accordingly, the lift columns are activated from time to time while the aircraft is being loaded and unloaded, in order to compensate for the vertical movement of the aircraft.

Typically, each lift column is provided with a separate mechanism for varying a length thereof. The mechanism optionally is electrohydraulic in nature, as where a motor drives a pump to supply fluid for extending and retracting a hydraulic cylinder, or is electromechanical in nature, as where a motor drives an electromechanical screw. In either case, the motor is responsive to a control signal for raising and lowering the outboard end of the passenger boarding bridge. For instance, in the case of an electromechanical screw a first control signal operates the motor in one direction and causes the mechanism to elevate the outboard end of the passenger boarding bridge, and a second control signal reverses the motor and causes the mechanism to lower the outboard end of the passenger boarding bridge.

In the case of electromechanical screw mechanisms, the motors must turn the screws of both lift columns at the same rate (to within a threshold limit) in order to successfully raise and lower the passenger boarding bridge. If the screws are turned at different rates, then a rack fault condition occurs in which the passenger boarding bridge twists between the two lift columns. The rack fault condition not only prevents further adjustment of the passenger boarding bridge, but may also cause damage thereto.

In the past, limit switches have been disposed one each on the lift columns of passenger boarding bridges. The limit switches are mechanical sensors, which are activated when one of the lift columns is moving slower relative to the other lift column. When activated, the limit switches provide a control signal for disabling further vertical adjustment of the passenger boarding bridge and for displaying an error message that is indicative of a rack fault condition having occurred. It is a disadvantage that the limit switches merely detect the rack fault condition after it has occurred. In particular, no further vertical movement of the passenger boarding bridge is possible until the rack fault condition is corrected, thereby causing a delay in disembarking the passengers that are aboard the aircraft. If the delay cannot be overcome then the next flight will not leave on time, which inconveniences the passengers and is costly for the airline.

SUMMARY OF EMBODIMENTS OF THE INVENTION

In accordance with an aspect of the instant invention there is provided a method for preventing a rack fault condition of a passenger boarding bridge, the passenger boarding bridge having a first electromechanical screw jack and a second electromechanical screw jack mounted one each adjacent opposite sidewall surfaces thereof, the method comprising: using a first electromagnetic sensor, sensing a number of rotations of the first electromechanical screw jack during a known period of time; using a second electromagnetic sensor, sensing a number of rotations of the second electromechanical screw jack during the known period of time; determining a difference between the number of rotations of the first electromechanical screw jack and the number of rotations of the second electromechanical screw jack during the known period of time; and, when the determined difference is outside a predetermined range of threshold values, providing a control signal for changing a rate of rotation of at least one of the first electromechanical screw jack and the second electromechanical screw jack.

In accordance with another aspect of the instant invention there is provided a method for preventing a rack fault condition of a passenger boarding bridge, the passenger boarding bridge having a first electromechanical screw jack and a second electromechanical screw jack mounted one each adjacent opposite sidewall surfaces thereof, the method comprising: using a plurality of electromagnetic sensors, sensing separately a rotational movement of each one of the first and second electromechanical screw jacks during a known period of time; based upon the sensed rotational movements, determining a value relating to a rotational synchronization of the first and second electromechanical screw jacks; comparing the determined value to threshold values; and, when the determined value is outside a predetermined range of threshold values, providing a control signal for affecting rotational movement of at least one of the first and second electromechanical screw jacks.

In accordance with another aspect of the instant invention there is provided a system for preventing a rack fault condition of a passenger boarding bridge, the passenger boarding bridge having a first electromechanical screw jack and a second electromechanical screw jack mounted one each adjacent opposite sidewall surfaces thereof, the system comprising: a plurality of electromagnetic sensors disposed for sensing separately a rotational movement of each one of the first and second electromechanical screw jacks; and, a control circuit in communication with the plurality of electromagnetic sensors for receiving therefrom signals indicative of the sensed rotational movement of each one of the first and second electromechanical screw jacks, for determining a value relating to a rotational synchronization of the first and second electromechanical screw jacks, and for providing a control signal for affecting the rotational movement of at least one of the first and second electromechanical screw jacks when the determined value is outside a predetermined range of threshold values.

In accordance with another aspect of the instant invention there is provided a system for preventing a rack fault condition of a passenger boarding bridge, the passenger boarding bridge having a first electromechanical screw jack and a second electromechanical screw jack mounted one each adjacent opposite sidewall surfaces thereof, the system comprising: a first cam structure on the first electromechanical screw jack and a second cam structure on the second electromechanical screw jack; a plurality of proximity sensors comprising a first proximity sensor disposed adjacent the first electromechanical screw jack and in an aligned facing relationship relative to the first cam structure and a second proximity sensor disposed adjacent the second electromechanical screw jack and in an aligned facing relationship with the second cam structure, the plurality of proximity sensors for sensing separately a rotational movement of each one of the first and second electromechanical screw jacks; and, a control circuit in communication with the plurality of electromagnetic sensors for receiving therefrom a signal indicative of the sensed rotational movement of each one of the first and second electromechanical screw jacks, for determining a value relating to a rotational synchronization of the first and second electromechanical screw jacks, and for providing a control signal for affecting the rotational movement of at least one of the first and second electromechanical screw jacks when the determined value is outside a predetermined range of threshold values.

In accordance with another aspect of the instant invention there is provided a method for preventing a rack fault condition of a passenger boarding bridge, the passenger boarding bridge having a first electromechanical screw jack and a second electromechanical screw jack mounted one each adjacent first and second opposite sidewall surfaces thereof, respectively, the method comprising: using a sensor, sensing a quantity that is indicative of a differential between vertical motion of the first sidewall surface of the passenger boarding bridge relative to vertical motion of the second sidewall surface of the passenger boarding bridge; based upon the sensed quantity, determining a corrective action for reducing the differential, the corrective action including changing a rate of rotation of the first electromechanical screw jack to a non-zero value; and, providing a control signal for affecting the corrective action.

In accordance with another aspect of the instant invention there is provided a method for determining an actual direction of rotation of an electromechanical screw, comprising: receiving at a first time $t_1$ a first signal that is indicative of a first rotational orientation of the electromechanical screw; receiving at a second time $t_2$ a second signal that is indicative of a second rotational orientation of the electromechanical screw; determining a time difference $\Delta t$ between $t_1$ and $t_2$; and, determining that the actual direction of rotation is clockwise when the determined time difference is within a first predetermined range of values, and determining that the actual direction of rotation is counter-clockwise when the determined time difference is within a second predetermined range of values.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
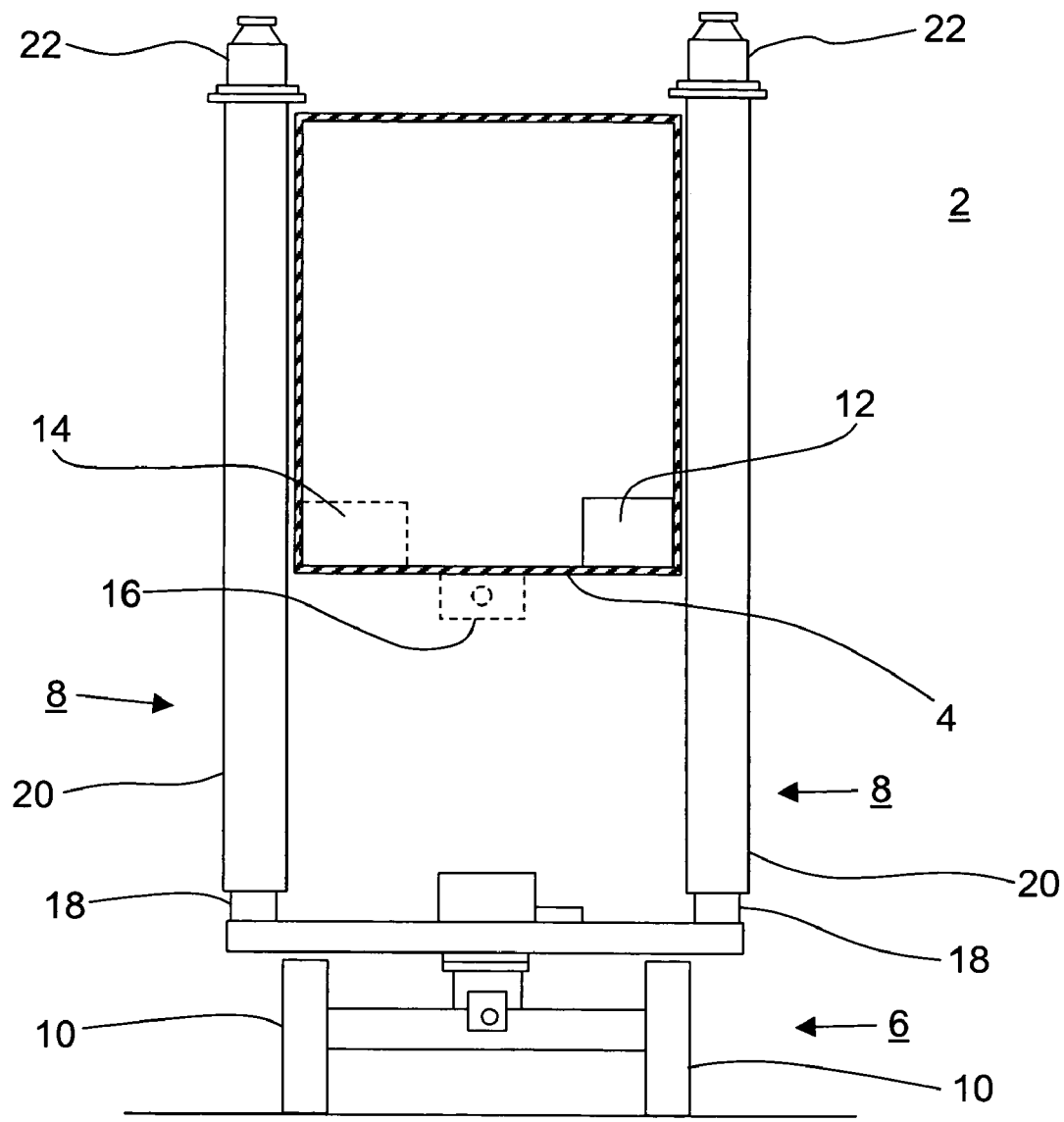
FIG. 1 is a is a simplified end view of a passenger boarding bridge.

Referring to FIG. 1, shown is a simplified end view of a passenger boarding bridge 2. The passenger boarding bridge 2 includes a tunnel section 4 that is supported near an outboard end thereof by a main elevating mechanism in the form of a wheel carriage 6 including adjustable support posts 8 and drive wheels 10. The drive wheels 10 are for achieving angular displacement of the tunnel section 4 along the apron surface. When the tunnel section 4 is telescopically extensible, then the drive wheels 10 are also used for extending the length of the tunnel section 4. Also shown in FIG. 1 is an operator control panel 12 disposed within tunnel section 4 for supporting manual operation of the passenger boarding bridge 2. The operator control panel 12 includes controls for adjusting the length, height, and angular orientation of the tunnel section 4 of passenger boarding bridge 2. By way of a specific and non-limiting example, the operator control panel 12 is disposed proximate an aircraft-engaging end of the passenger boarding bridge 2, such that a human operator may observe directly the alignment toward an aircraft doorway. Optionally, an automated bridge alignment control system including a bridge controller 14 is provided for operating the passenger boarding bridge 2 in an automated manner. An optional imager 16 is provided proximate the aircraft-engaging end of passenger boarding bridge 2, and in communication with bridge controller 14 for providing image data thereto. An example of an automated bridge alignment control system suitable for use with the passenger boarding bridge of FIG. 1 is disclosed in U.S. Pat. No. 6,724,314, issued to Hutton on Apr. 20, 2004, the entire contents of which is herein incorporated by reference.

Referring still to FIG. 1, support posts 8 are mounted one each adjacent opposite sidewall surfaces of the passenger boarding bridge 2. Each support post 8 includes an inner tube 18 that is telescopically received within an outer tube 20, such that the overall length of each support post 8 is controllably variable. A not illustrated mechanism, such as for instance an electromechanical screw jack, is disposed within each support post 8. A motor 22 is rotationally coupled to each electromechanical screw jack. When the motor 22 receives a control signal for adjusting the height of the tunnel section 4, the motor turns the electromechanical screw jack in the appropriate direction for making the required adjustment. In order to successfully raise and lower the tunnel section 4, each motor 22 turns the electromechanical screw jack coupled thereto in rotational synchronization relative to the other, within a known threshold limit. When the two electromechanical screw jacks are rotationally synchronized, then the tunnel section 4 is elevated or lowered uniformly on both sides thereof. Loss of rotational synchronization, for instance when one motor 22 is turning faster than the other, causes the support posts 8 to move out of square as a rack fault condition develops. Eventually, the tunnel section 4 seizes at a current height and cannot be elevated or lowered until the rack fault condition is corrected.

Figure 2A:
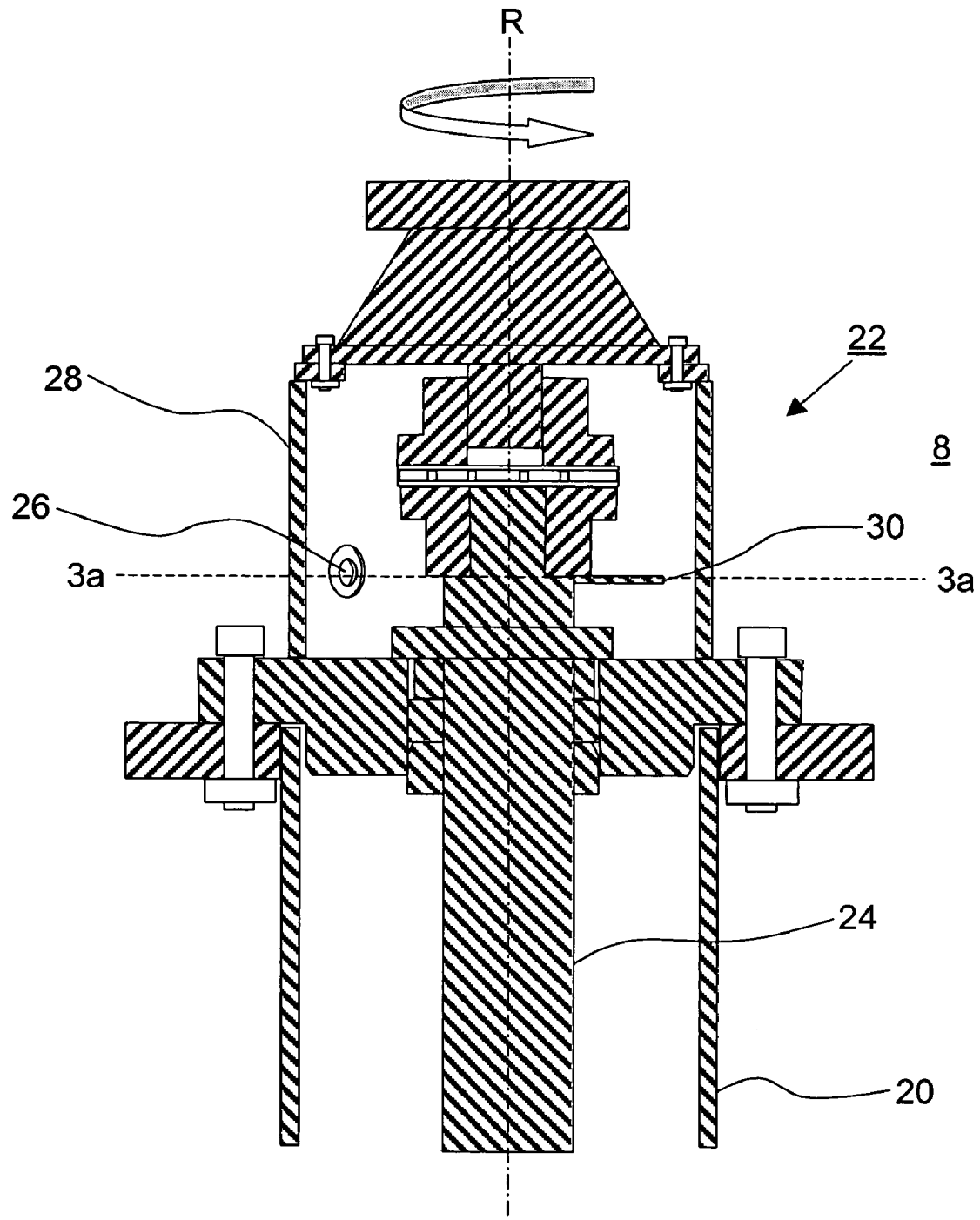
FIG. 2a is a partial cross-sectional side view of a support post, including a sensor and a cam structure according to an embodiment of the instant invention.

Referring now to FIG. 2a shown is a partial cross-sectional side view of a support post 8, including a sensor and a cam structure according to an embodiment of the instant invention. The motor 22 is mounted to the outer tube 20 and is rotationally coupled to an electromechanical screw 24, which is disposed within the support post 8. The motor 22 turns the electromechanical screw 24 about rotational axis R. An electromagnetic sensor, in the form of proximity sensor 26, is disposed within a sidewall surface 28 of the housing of motor 22. Additionally, a cam structure 30 is mounted to a portion of the electromechanical screw 24. The cam structure 30 turns with the electromechanical screw 24 as the tunnel section is being elevated or lowered. For each complete revolution of the electromechanical screw 24, an edge surface of the cam structure 30 moves past the proximity sensor 26 and is sensed thereby. Each time the proximity sensor 26 senses the cam structure 30, a signal is provided to a not illustrated controller circuit. Of course, the structure that is shown in FIG. 2a is duplicated for each support post 8 of the passenger boarding bridge that is shown at FIG. 1. Accordingly, the not illustrated controller circuit receives two separate signals; a first signal relating to a sensed rotational motion of the electromechanical screw jack that is mounted adjacent to the left sidewall surface of the tunnel section 4, and a second signal relating to a sensed rotational motion of the electromechanical screw jack that is mounted adjacent to the right sidewall surface of the tunnel section 4

Figure 2B:
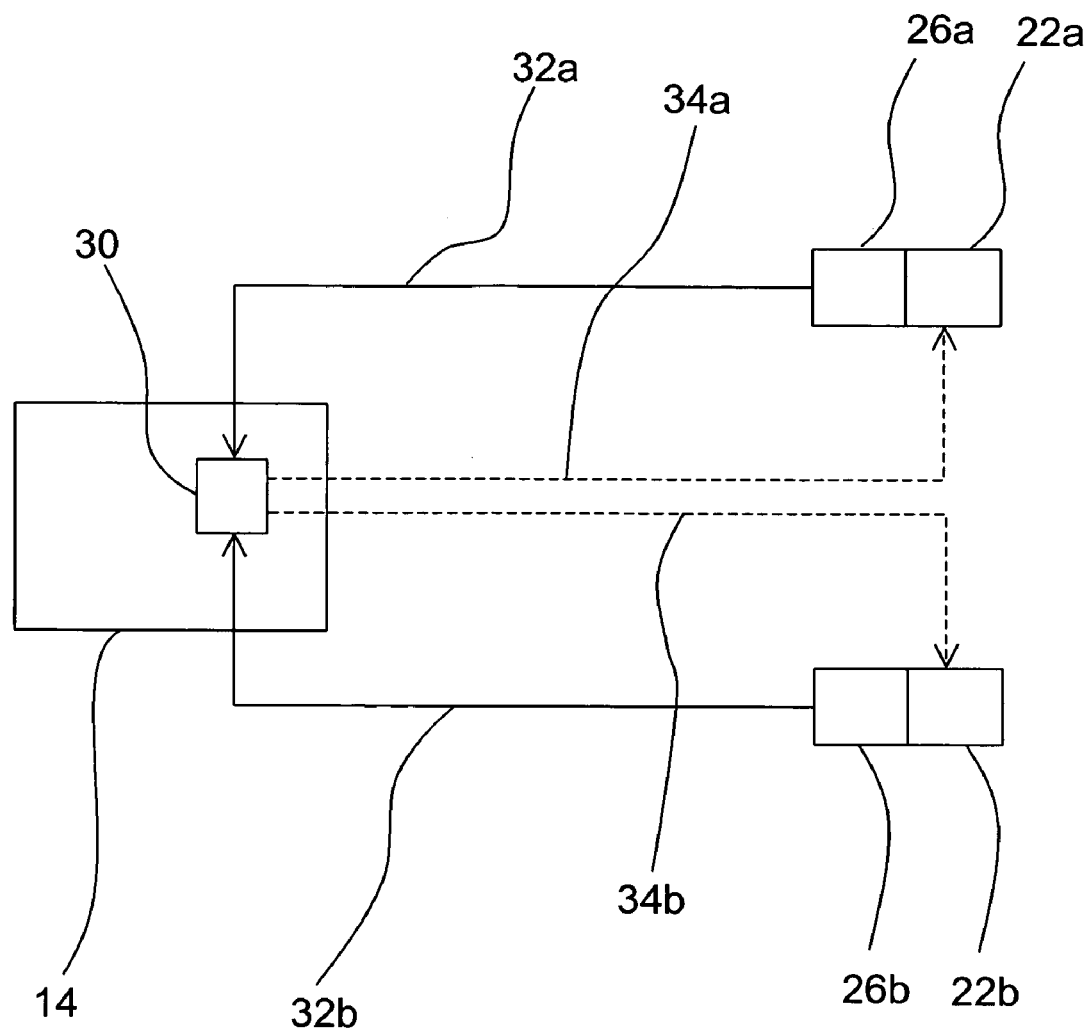
FIG. 2b is a simplified block diagram showing a feed-back control loop including a controller circuit.

Referring now to FIG. 2b, shown is a simplified block diagram showing a feedback control loop including a controller circuit. For instance, the controller circuit 30 is integrated into or is in communication with bridge controller 14. During use the controller circuit processes the two separately received signal trains, which are provided from sensors 26a and 26b via separate communication pathways 32a and 32b, respectively. In this description, reference numerals having an "a" appended thereto relate to components associated with the support post mounted adjacent the left sidewall surface of the tunnel section 4, whereas reference numerals having a "b" appended thereto relate to components associated with the support post mounted adjacent the right sidewall surface of the tunnel section 4. The processing is for determining rotational synchronization between the two electromechanical screw jacks. For instance, the controller circuit 30 processes the first signal to determine a value indicative of one of a rate of rotation and an absolute number of rotations of the electromechanical screw jack that is mounted adjacent to the left sidewall surface of the tunnel section 4. Similarly, the controller circuit 30 processes the second signal to determine a value indicative of one of a rate of rotation and an absolute number of rotations of the electromechanical screw jack that is mounted adjacent to the right sidewall surface of the tunnel section 4. The determined values are compared one to the other. If the two values agree to within a predetermined threshold amount, then rotational synchronization of the screw jacks is confirmed. Optionally, the time difference between receiving the first and second signals is monitored for a known period of time. If the time difference between receiving the first and second signals does not change by more than a predetermined threshold amount during the known period of time, either increasingly or decreasingly, then rotational synchronization is confirmed. When rotational synchronization is confirmed, then no corrective action is taken and the bridge continues to operate as described above.

When rotational synchronization is not confirmed, for instance when one of the electromechanical screw jacks is turning faster than the other, the controller circuit 30 provides a feedback signal along at least one of the feedback communication pathways 34a and 34b for preventing an occurrence of a rack fault condition. In particular, the feedback signal is provided to at least one of the two motors 22a and 22b for affecting a rotational rate of the electromechanical screw jack that is coupled thereto. By way of a non-limiting example, it is assumed that the electromechanical screw jack adjacent to the left sidewall surface of the tunnel section 4 is turning faster relative to the electromechanical screw jack adjacent to the right sidewall surface of the tunnel section 4. In this case, the controller circuit 30 optionally provides a signal along feedback communication pathway 34a for reducing the rotational rate of motor 22a, or provides a signal along feedback communication pathway 34b for increasing the rotational rate of motor 22b. Further optionally, controller circuit 30 provides a signal along each one of feedback communication pathways 34a and 34b for reducing the rotational rate of motor 22a and for increasing the rotational rate of motor 22b, respectively. Of course, the rotational rate changes are smaller in the case of both motors being adjusted, compared to the case of only one of the motors being adjusted. Further optionally, the controller circuit 30 provides a signal along each one of feedback communication pathways 34a and 34b for stopping both motors 22a and 22b. This latter option interrupts the operation of the bridge, but advantageously prevents a rack fault condition from developing. Accordingly, a human operator responding to the bridge fault simply resumes operation of the bridge. Optionally, resumption of bridge operation is performed in an automated manner after passage of a known period of time. In either case, the delays that are associated with an occurrence of a rack fault condition, including the repair of any damage resulting therefrom, are reduced or eliminated entirely.

Figure 3A:
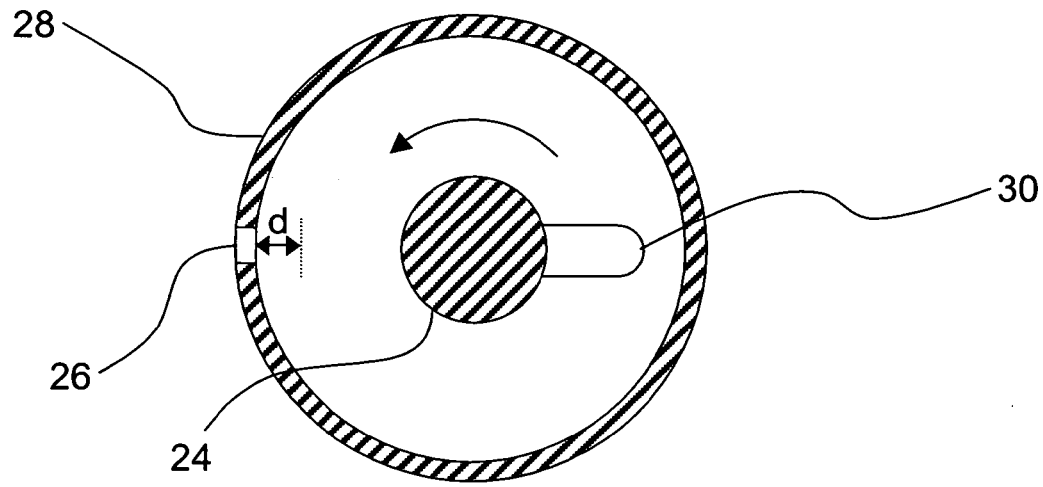
FIG. 3a is a cross-sectional end view of the support post of FIG. 2a taken along dotted line 3a-3a, including one sensor.

Referring now to FIG. 3a, shown is a cross-sectional end view of the support post of FIG. 2a taken along the line 3a-3a, and including one proximity sensor 26. The proximity sensor 26 is mounted through the sidewall surface 28 of the housing of motor 22. The proximity sensor 26 senses the cam structure 30 at a distance "d," but does not sense other portions of the electromechanical screw. The cam structure 30 is not sensed beyond distance "d." Accordingly, the proximity sensor 26 produces one signal per revolution resulting from the cam structure approaching to within distance "d" of the proximity sensor. Optionally, the proximity sensor 26 is mounted through the sidewall surface of the outer tube 20 and the cam structure 30 is mounted on the upper edge of the electromechanical screw 24 and at a position that is aligned with the proximity sensor 26.

Figure 3B:
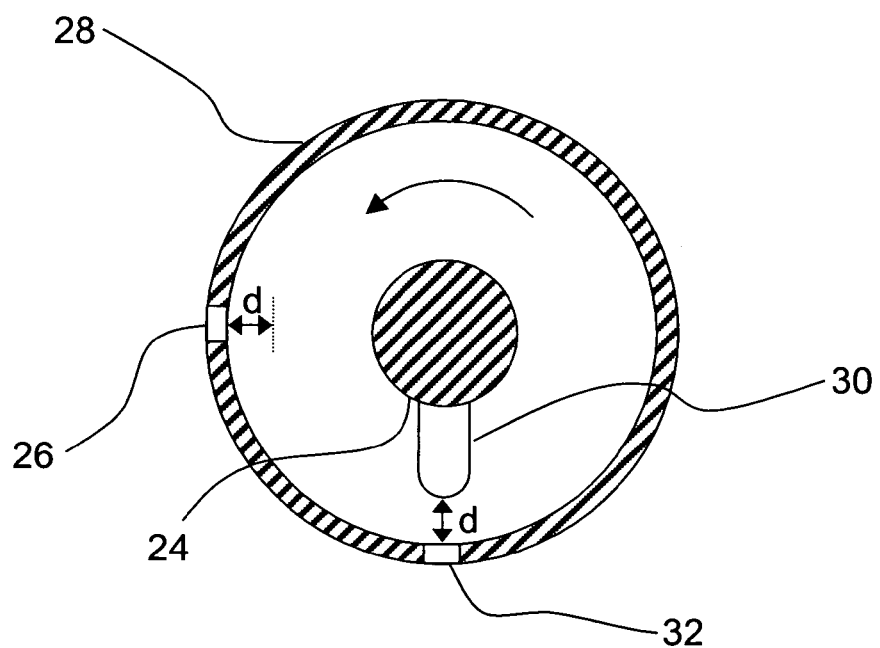
FIG. 3b is a cross-sectional end view of the support post of FIG. 2a, including a plurality of sensors.

Referring now to FIG. 3b, shown is a cross-sectional end view of the support post of FIG. 2a, similar to the view shown in FIG. 3a but including a plurality of proximity sensors. In the example that is shown in FIG. 3b, two proximity sensors 26 and 32 are mounted at 90° through portions of the sidewall surface 28 of the housing of motor 22. Each proximity sensor 26 and 32 senses the cam structure 30 at a distance "d," but does not sense other portions of the electromechanical screw. The cam structure 30 is not sensed beyond distance "d." Accordingly, each proximity sensor 26 produces one signal per revolution resulting from the cam structure approaching to within distance "d" of the proximity sensor. Stated differently, the cam structure 30 induces two signals per revolution of the electromechanical screw, one signal for each proximity sensor 26 and 32. Providing a plurality of proximity sensors 26 ensures redundancy in the event that one sensor fails. Although the sensor 32 is shown at 90° around the housing of motor 22 relative to the sensor 26 in FIG. 3b, it is to be understood that the two sensors may be arranged one relative to the other at any position around the housing of motor 22, including 180°.

Advantageously, providing the proximity sensor 32 at 90° around the housing of motor 22 relative to proximity sensor 26 as shown in FIG. 3b allows for determination of the rotational direction of the electromechanical screw. In this case, each proximity sensor 26 and 32 sends a uniquely identifiable signal each time the cam structure 30 is sensed. When the time delay between the unique signal for sensor 26 and the unique signal for sensor 32 is short compared to the time delay between the unique signal for sensor 32 and the unique signal for sensor 26, it is determined that the cam structure 30, and therefore the entire electromechanical screw, is rotating in a clockwise direction in FIG. 3b. Alternatively, when the time delay between the unique signal for sensor 32 and the unique signal for sensor 26 is short compared to the time delay between the unique signal for sensor 26 and the unique signal for sensor 32, it is determined that the cam structure 30, and therefore the entire electromechanical screw, is rotating in a counter-clockwise direction in FIG. 3b. The actual direction of rotation, which is sensed in the manner described above, can then be compared to the expected direction of rotation for a particular bridge movement. When the actual direction of rotation does not agree with the expected direction of rotation it is known that an error has occurred, and that the bridge is moving vertically in the wrong direction. Optionally, a control circuit automatically stops vertical movement of the bridge or corrects vertical movement of the bridge. Further optionally, an alarm sounds when it is determined that the bridge is moving vertically in the wrong direction.

Optionally, the system is automatically self-calibrating. For instance, the control circuit 30 initiates a calibration cycle at predetermined intervals. Calibration optionally occurs after an aircraft moves away from the boarding bridge, or after a predetermined number of aircraft have been serviced, or after a fault is detected, etc. During the calibration cycle, the control circuit 30 positions the boarding bridge away from any nearby obstructions including aircraft and ground service vehicles. Next, the control circuit 30 adjusts the height of the boarding bridge to a known position. By way of example, the boarding bridge is lowered to a limit as defined by a fixed limit switch. Optionally, the current height of the bridge is compared with the known height of the fixed limit switch, and the current height of the bridge is updated when the result of the comparison is outside a predetermined threshold value. Alternatively, the current height of the bridge is reset to the known height of the fixed limit switch during each calibration cycle. Optionally, an upper limit switch is provided at a known height in addition to the lower limit switch. The upper limit switch is used to ensure that calibration is maintained over the full range of vertical movement of the boarding bridge.

Figure 4:
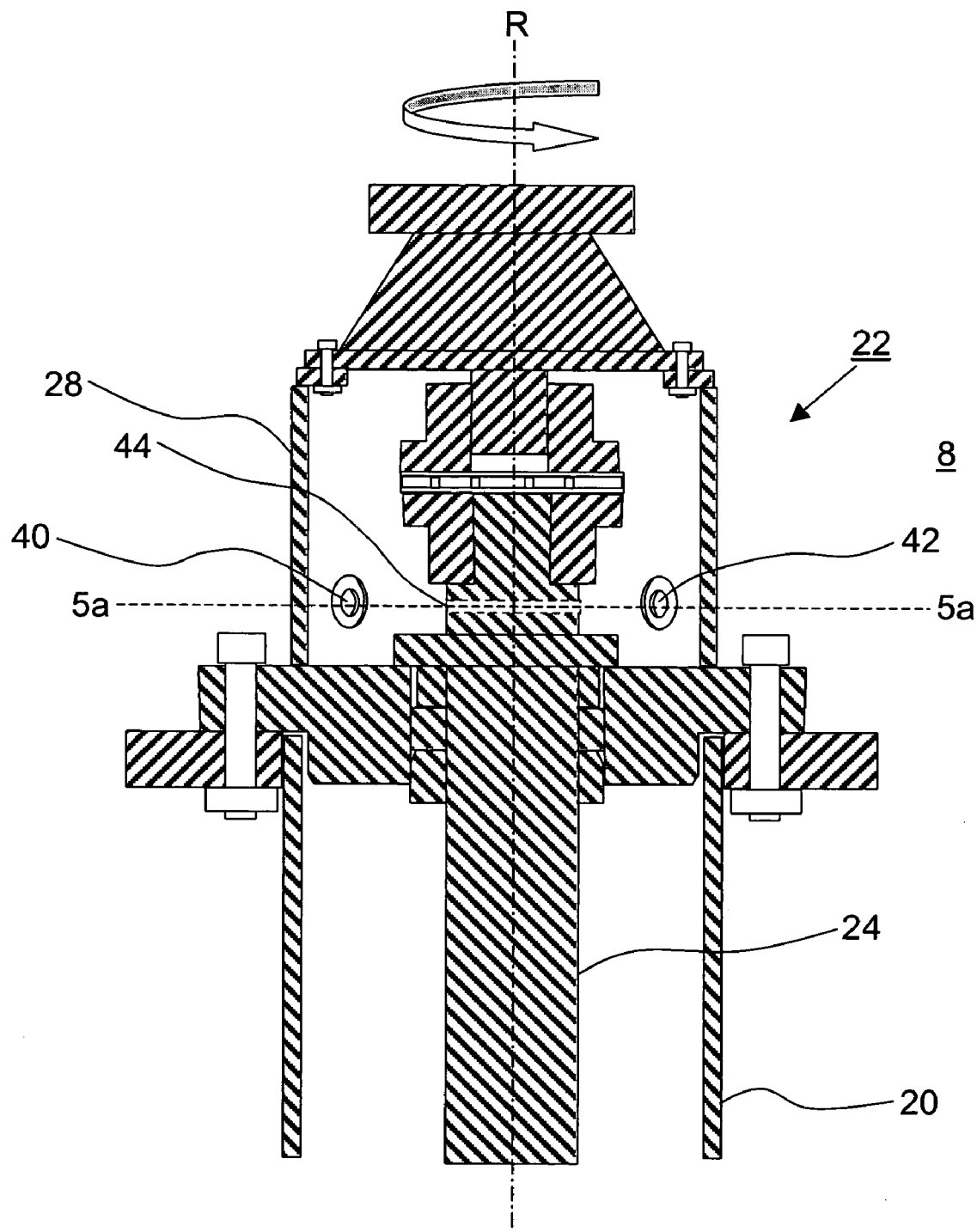
FIG. 4 is a partial cross-sectional side view of a support post, including a radiation transmitter and a radiation detector according to an embodiment of the instant invention.

Referring now to FIG. 4, shown is a partial cross-sectional side view of a support post, including an electromagnetic sensor in the form of an electromagnetic radiation transmitter and an electromagnetic radiation detector, according to an embodiment of the instant invention. The motor 22 is mounted to the outer tube 20 and is rotationally coupled to an electromechanical screw 24, which is disposed within the support post 8. The motor 22 turns the electromechanical screw 24 about rotational axis R. An electromagnetic radiation transmitter 40 is disposed within a sidewall surface 28 of the housing of motor 22. An electromagnetic radiation detector 42 is disposed within a portion of sidewall surface 28 that faces the electromagnetic radiation transmitter 40, such that the electromechanical screw jack 24 is disposed therebetween. A passageway 44 through the electromechanical screw jack 24 provides intermittent optical communication between the electromagnetic radiation transmitter 40 and the electromagnetic radiation detector 42. In particular, the passageway 44 is aligned along an optical path between the electromagnetic radiation transmitter 40 and the electromagnetic radiation detector 42 two times per revolution of the electromechanical screw jack 24. Each time the passageway 44 comes into alignment with the optical path, radiation that is transmitted from the electromagnetic radiation transmitter 40 reaches the electromagnetic radiation detector 42 and causes a signal to be produced. The signal is provided to a not illustrated controller circuit, and processed accordingly, in a manner similar to that described with reference to FIGS. 2a and 2b. Optionally, the electromagnetic radiation transmitter 40 transmits radiation from the infrared, visible or ultraviolet region of the electromagnetic spectrum. The electromagnetic radiation detector accommodates detection of radiation under conditions of rapid intensity change, for instance at a rate of at least two times the maximum operational rotation speed of the electromechanical screw jack. Optionally, the passageway 44 includes light focusing elements, light dispersing elements, or other suitable optical components of the type that are known to one of skill in the art.

Figure 5A:
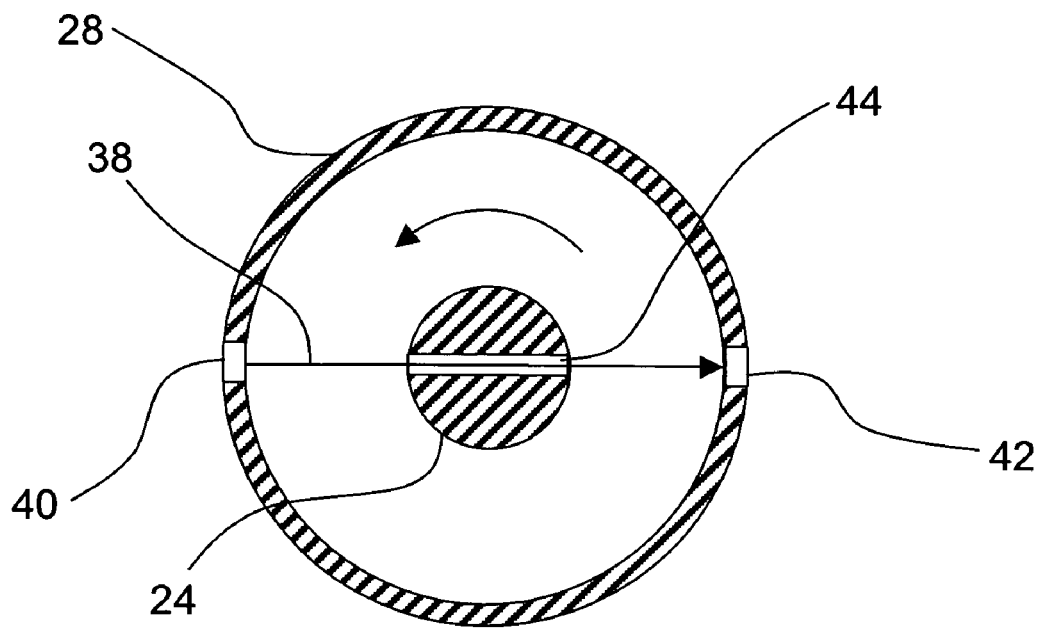
FIG. 5a is a cross-sectional end view of the support post of FIG. 4 in a first orientation.

Referring now to FIG. 5a, shown is a cross-sectional end view of the support post of FIG. 4 taken along the line 5a-5a, and in a first orientation. In the first orientation, radiation that is launched along an optical path 38 between the electromagnetic radiation transmitter 40 and the electromagnetic radiation detector 42 passes all the way through the passageway 44. The electromagnetic radiation detector registers a high intensity of radiation, and provides a signal indicative of a radiation maximum. The signal is provided to a controller circuit in a manner similar to that described with reference to FIG. 2b.

Figure 5B:
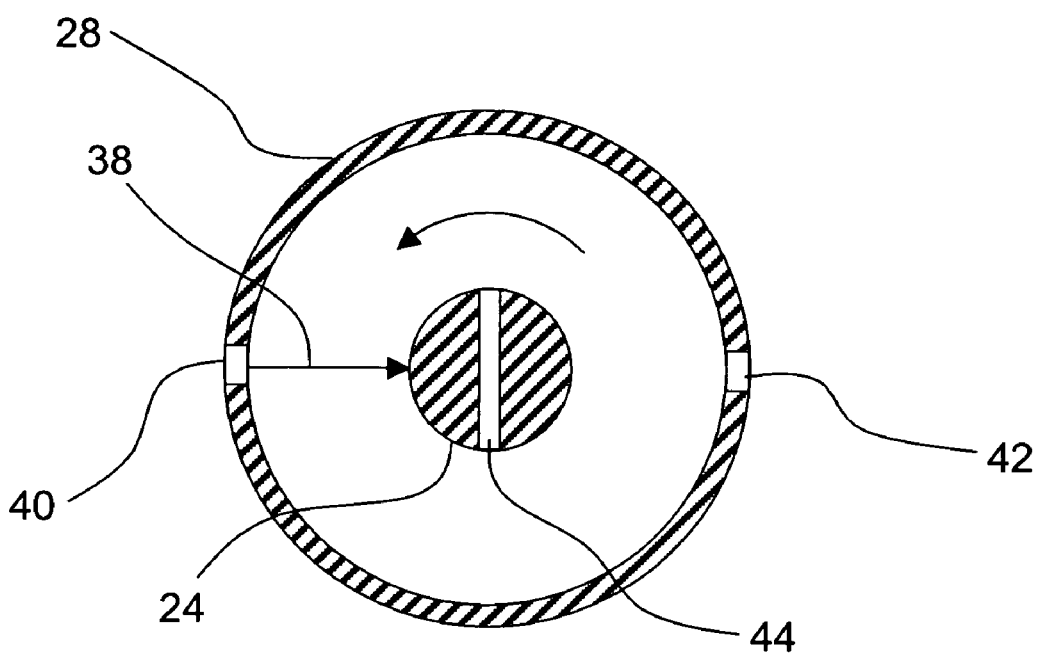
FIG. 5b is a cross-sectional end view of the support post of FIG. 4 in a second orientation.

Referring now to FIG. 5b, shown is a cross-sectional end view similar to that of FIG. 5a, but in a second orientation. In the second orientation, radiation that is launched along an optical path 38 between the electromagnetic radiation transmitter 40 and the electromagnetic radiation detector 42 encounters a surface of the electromechanical screw jack 24, and does not reach all the way to the electromagnetic radiation detector. Accordingly, the electromagnetic radiation detector 42 does not register a high intensity of radiation. In other words, the amount of radiation reaching the electromagnetic radiation detector 42 is less than a predetermined threshold amount that is required in order for the electromagnetic radiation detector to provide a signal indicative of a radiation maximum.

Referring now to FIGS. 5a and 5b together, the passageway 44 is aligned with the optical path 38 only two times per revolution of the electromechanical screw jack. Starting from the first orientation, further rotation of the electromechanical screw jack about the axis R results in a rapid decrease in the intensity of radiation that reaches the radiation detector. Each 180° rotation step produces a narrow, intensity maximum peak. Optionally, additional passageways are provided through the electromechanical screw jack 24, intersecting at a known angle with the passageway 44. For instance, a second passageway normal to the passageway 44 results in a narrow, intensity maximum peak at each 90° rotational step. Of course, when two separate passageways are provided, then the electromagnetic radiation detector must be able to respond to radiation intensity changes at a rate of at least four times the maximum operational rotation speed of the electromechanical screw jack.

Optionally, the system is automatically self-calibrating. For instance, the control circuit 30 initiates a calibration cycle at predetermined intervals. Calibration optionally occurs after an aircraft moves away from the boarding bridge, or after a predetermined number of aircraft have been serviced, or after a fault is detected, etc. During the calibration cycle, the control circuit 30 positions the boarding bridge away from any nearby obstructions including aircraft and ground service vehicles. Next, the control circuit 30 adjusts the height of the boarding bridge to a known position. By way of example, the boarding bridge is lowered to a limit as defined by a fixed limit switch. Optionally, the current height of the bridge is compared with the known height of the fixed limit switch, and the current height of the bridge is updated when the result of the comparison is outside a predetermined threshold value. Alternatively, the current height of the bridge is reset to the known height of the fixed limit switch during each calibration cycle. Optionally, an upper limit switch is provided at a known height in addition to the lower limit switch. The upper limit switch is used to ensure that calibration is maintained over the full range of vertical movement of the boarding bridge.

Figure 6:
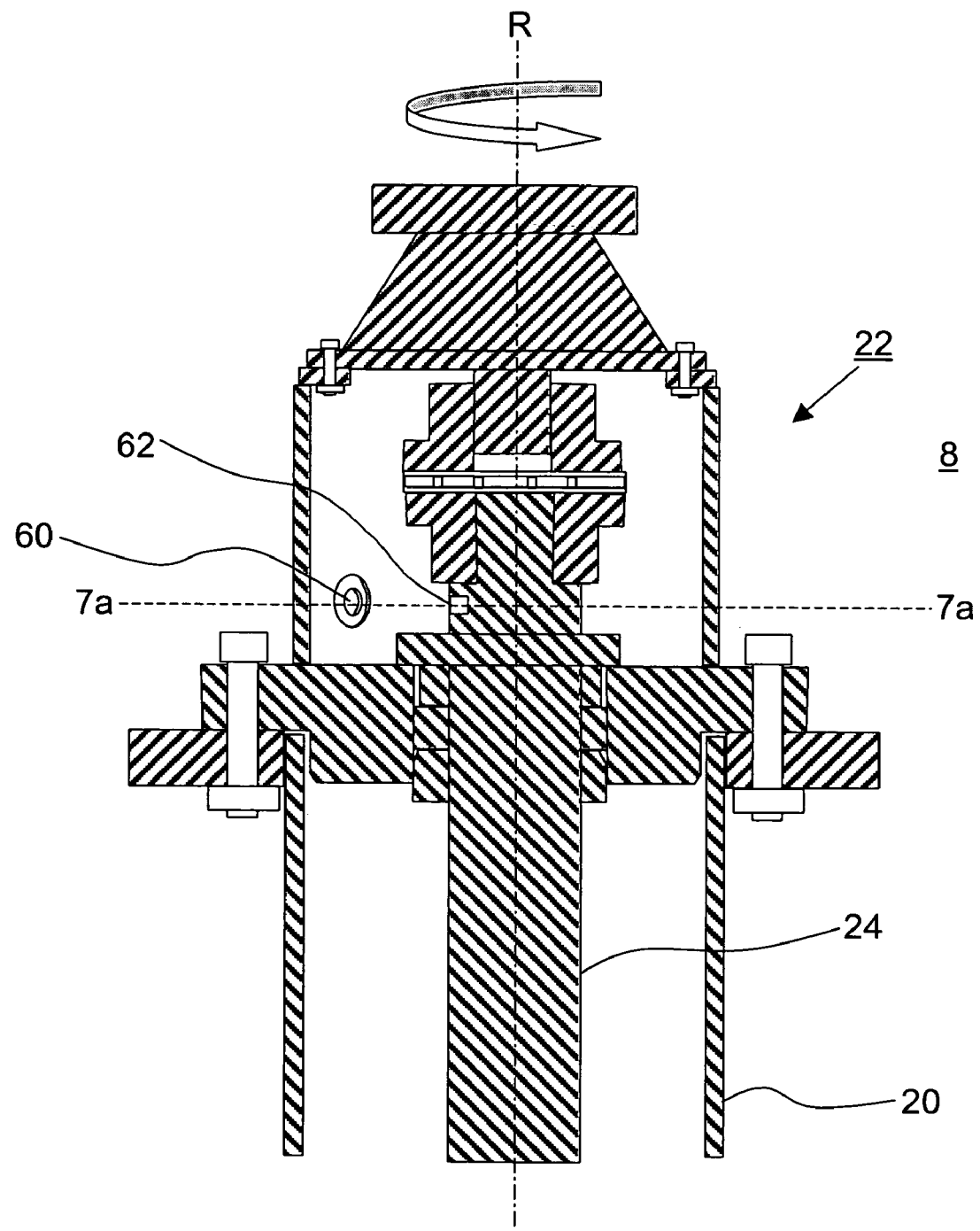
FIG. 6 is a partial cross-sectional side view of a support post, including a radiation transmitter and detector and a reflective element according to an embodiment of the instant invention.

Referring now to FIG. 6, shown is a partial cross-sectional side view of a support post, including an electromagnetic sensor in the form of an electromagnetic radiation transmitter and detector and a reflective element, according to an embodiment of the instant invention. The motor 22 is mounted to the outer tube 20 and is rotationally coupled to an electromechanical screw 24, which is disposed within the support post 8. The motor 22 turns the electromechanical screw 24 about rotational axis R. An electromagnetic radiation transmitter 60 is disposed within a sidewall surface 28 of the housing of motor 22. Furthermore, a reflective element 62, such as for instance a mirror, is disposed along the electromechanical screw at a position for facing the electromagnetic radiation transmitter 60. Each time the reflective element 62 comes into alignment with the electromagnetic radiation transmitter 60, radiation that is transmitted from the electromagnetic radiation transmitter 60 is reflected to an electromagnetic radiation detector and causes a signal to be produced. Optionally, the electromagnetic radiation detector is incorporated into the electromagnetic radiation transmitter 60, or is provided adjacent to the electromagnetic radiation transmitter 60. In either case, the reflective element is arranged such that radiation that is transmitted from the electromagnetic radiation transmitter 60 produces a narrow intensity maximum peak at the electromagnetic radiation detector, which causes a signal to be produced. The signal is provided to a not illustrated controller circuit, and processed accordingly, in a manner similar to that described with reference to FIGS. 2a and 2b. Optionally, the electromagnetic radiation transmitter 60 transmits radiation from the infrared, visible or ultraviolet region of the electromagnetic spectrum. The electromagnetic radiation detector accommodates detection of radiation under conditions of rapid intensity change, for instance at a rate that is equal to at least the maximum operational rotation speed of the electromechanical screw jack.

Figure 7A:
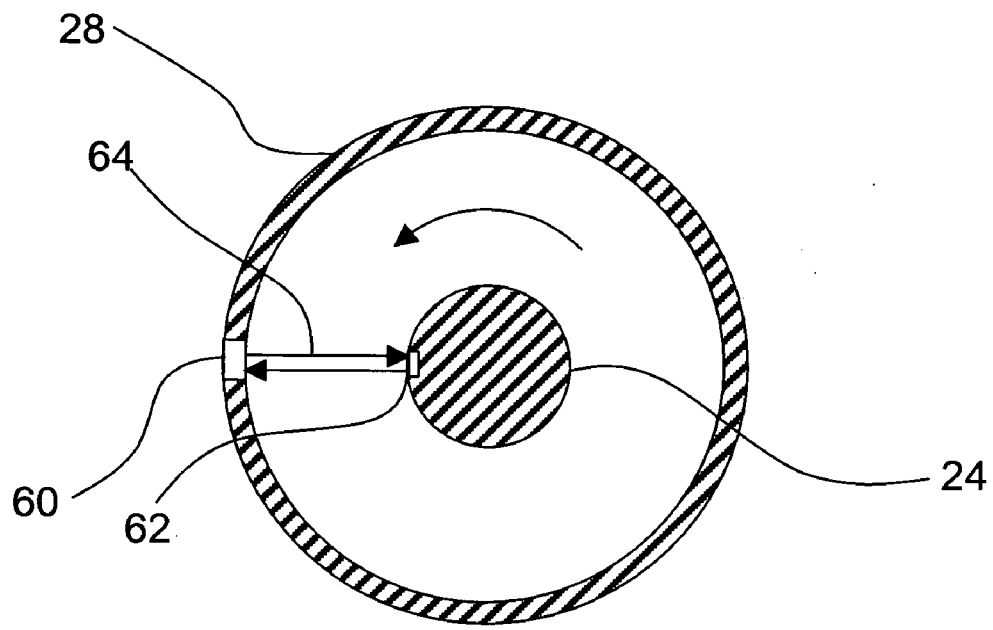
FIG. 7a is a cross-sectional end view of the support post of FIG. 6 in a first orientation.

Referring now to FIG. 7a, shown is a cross-sectional end view of the support post of FIG. 6 in a first orientation, taken along the line 7a-7a. In the first orientation, radiation that is launched along an optical path 64 between the electromagnetic radiation transmitter 60 and the reflective element 62 is folded back along the optical path 64. An electromagnetic radiation detector element that is incorporated into the electromagnetic radiation transmitter 60 registers a high intensity of radiation, and provides a signal indicative of a radiation maximum. The signal is provided to a controller circuit in a manner similar to that described with reference to FIG. 2b.

Figure 7B:
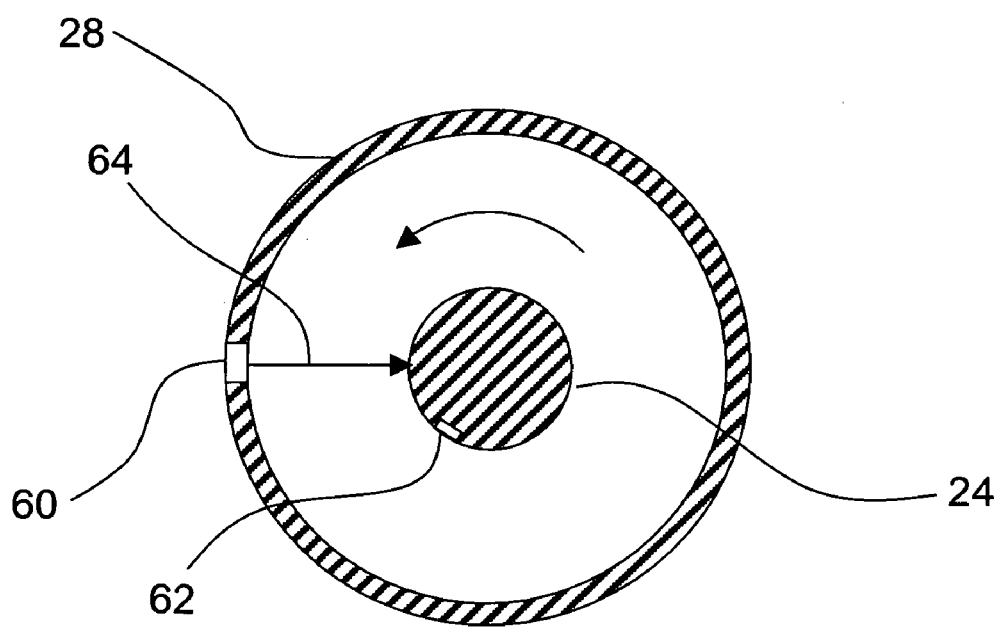
FIG. 7b is a cross-sectional end view of the support post of FIG. 6 in a second orientation.

Referring now to FIG. 7b, shown is a cross-sectional end view similar to that of FIG. 7a but in a second orientation. In the second orientation, radiation that is launched along the optical path 64 encounters a surface of the electromechanical screw jack 24, and is not reflected or folded back to an electromagnetic radiation detector element. Accordingly, the electromagnetic radiation detector element does not register a high intensity of radiation. In other words, the amount of radiation reaching the electromagnetic radiation detector element is less than a predetermined threshold amount that is required in order for the radiation detector element to provide a signal indicative of a radiation maximum.

Referring now to FIGS. 7a and 7b together, the reflective element 62 is aligned with the electromagnetic radiation transmitter 60 only one time per revolution of the electromechanical screw jack. Starting from the first orientation, further rotation of the electromechanical screw jack about the axis R results in a rapid decrease in the intensity of radiation that reaches the radiation detector element. Each 360° rotation step, that is to say each revolution, produces a narrow intensity maximum peak. Optionally, additional reflective elements 62 are provided in a circumferentially spaced apart arrangement around the electromechanical screw 24. For instance, a first reflective element is disposed at 0° and a second reflective element is disposed at 90° counter-clockwise relative to the first reflective element. Of course, when two separate reflective elements are provided, then the radiation detector must be able to respond to radiation intensity changes at a rate of at least two times the maximum operational rotation speed of the electromechanical screw jack.

Optionally, the electromagnetic radiation transmitter 60 launches polychromatic light along the optical path 64. When the two reflective surfaces are adapted for reflecting different wavelengths of electromagnetic radiation, then it is possible to discern the origin of reflected radiation. Stated differently, when electromagnetic radiation within a first range of wavelengths is detected it is known that the reflective element at 0° is aligned with the electromagnetic radiation transmitter 60, and when electromagnetic radiation within a second range of wavelengths is detected it is known that the reflective element at 90° is aligned with the electromagnetic radiation transmitter 60. When the time delay between detecting electromagnetic radiation within the first range of wavelengths and detecting electromagnetic radiation within the second range of wavelengths is short compared to the time delay between detecting electromagnetic radiation within the second range of wavelengths and detecting electromagnetic radiation within the first range of wavelength, it is determined that the electromechanical screw, is rotating in a clockwise direction. The actual direction of rotation, which is sensed in the manner described above, can then be compared to the expected direction of rotation for a particular bridge movement. When the actual direction of rotation does not agree with the expected direction of rotation it is known that an error has occurred, and that the bridge is moving vertically in the wrong direction. Optionally, a control circuit automatically stops vertical movement of the bridge or corrects vertical movement of the bridge. Further optionally, an alarm sounds when it is determined that the bridge is moving vertically in the wrong direction.

Optionally, the system is automatically self-calibrating. For instance, the control circuit 30 initiates a calibration cycle at predetermined intervals. Calibration optionally occurs after an aircraft moves away from the boarding bridge, or after a predetermined number of aircraft have been serviced, or after a fault is detected, etc. During the calibration cycle, the control circuit 30 positions the boarding bridge away from any nearby obstructions including aircraft and ground service vehicles. Next, the control circuit 30 adjusts the height of the boarding bridge to a known position. By way of example, the boarding bridge is lowered to a limit as defined by a fixed limit switch. Optionally, the current height of the bridge is compared with the known height of the fixed limit switch, and the current height of the bridge is updated when the result of the comparison is outside a predetermined threshold value. Alternatively, the current height of the bridge is reset to the known height of the fixed limit switch during each calibration cycle. Optionally, an upper limit switch is provided at a known height in addition to the lower limit switch. The upper limit switch is used to ensure that calibration is maintained over the full range of vertical movement of the boarding bridge.

Figure 8A:
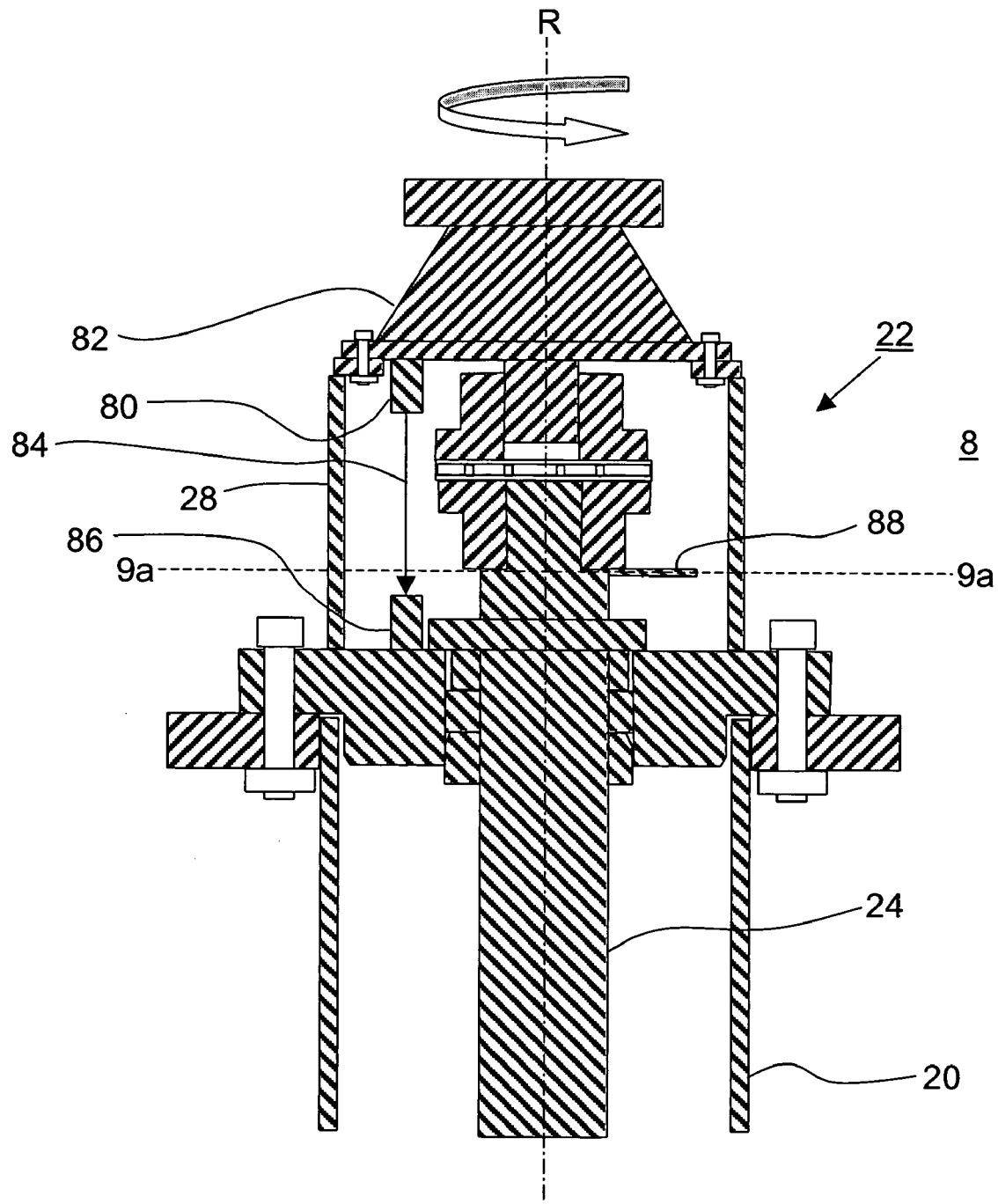
FIG. 8a is a partial cross-sectional side view of a support post, including a radiation transmitter and detector and a cam structure according to an embodiment of the instant invention, in a first orientation.

Referring now to FIG. 8a, shown is a partial cross-sectional side view of a support post, including a radiation transmitter and detector and a cam structure according to an embodiment of the instant invention, in a first orientation. The motor 22 is mounted to the outer tube 20 and is rotationally coupled to an electromechanical screw 24, which is disposed within the support post 8. The motor 22 turns the electromechanical screw 24 about rotational axis R. A radiation transmitter 80 is disposed adjacent to an endcap structure 82 of the housing of motor 22. The radiation transmitter 80 is disposed for launching electromagnetic radiation along an optical path 84 that is parallel to the rotational axis "R." A radiation detector 86 is disposed along optical path 84 for receiving radiation transmitted from the radiation transmitter. Additionally, a cam structure 88 is mounted to a portion of the electromechanical screw 24. The cam structure 88 turns with the electromechanical screw 24 as the tunnel section is being elevated or lowered. In the orientation that is illustrated in FIG. 8a, radiation is transmitted between the radiation transmitter 80 and the radiation detector 86, such that the radiation detector 86 registers a high radiation intensity.

Figure 8B:
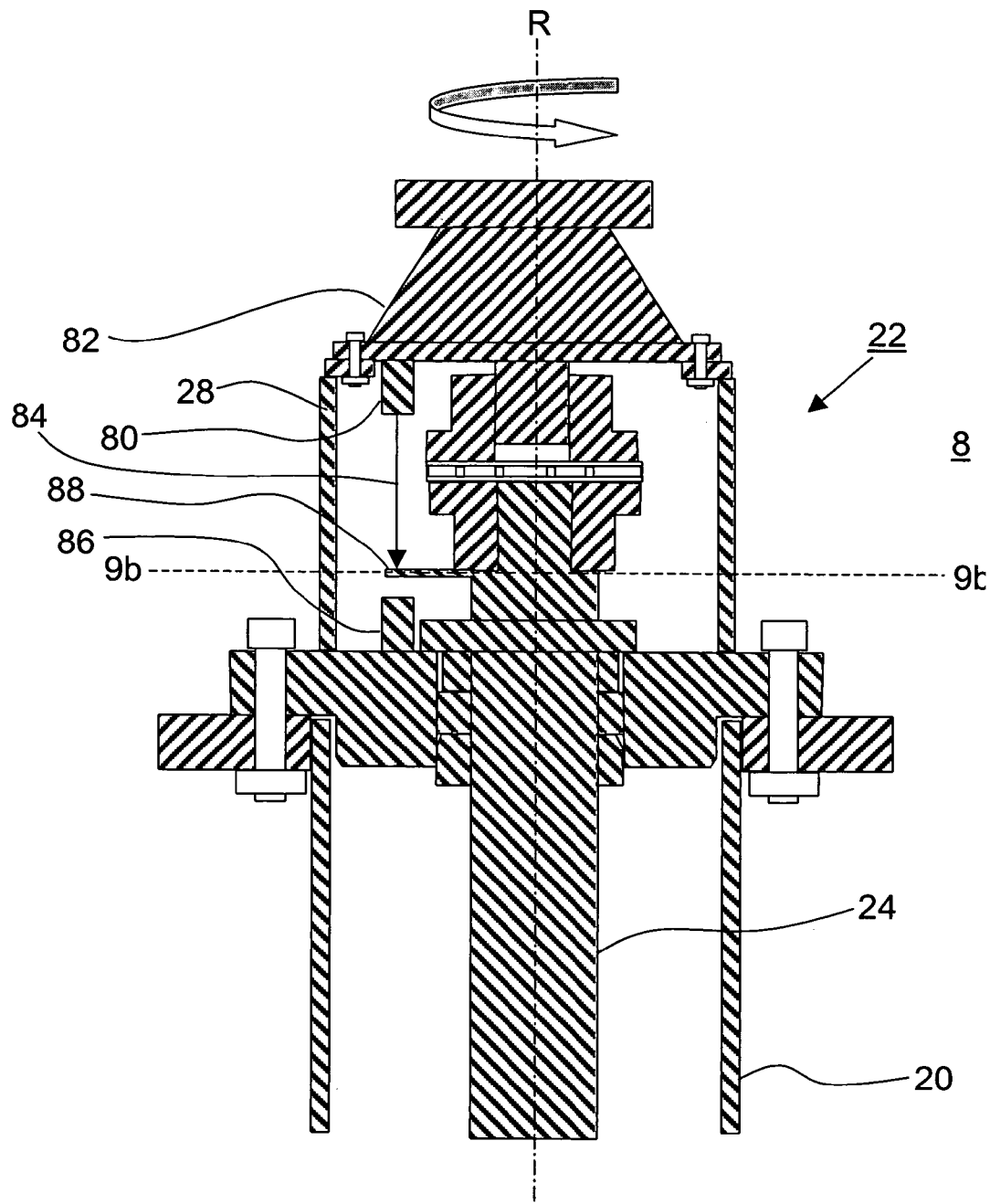
FIG. 8b is a partial cross-sectional side view of a support post, including a radiation transmitter and detector and a cam structure according to an embodiment of the instant invention, in a second orientation.

Referring now to FIG. 8b, shown is a partial cross-sectional side view of a support post, including a radiation transmitter and detector and a cam structure according to an embodiment of the instant invention, in a second orientation. For each complete revolution of the electromechanical screw 24, the cam structure passes between the radiation transmitter 80 and the radiation detector 86, thereby interrupting the beam of electromagnetic radiation, and causing the radiation detector 86 to register a radiation intensity minimum. The radiation detector 86 produces a signal when the radiation intensity minimum is registered. The signal is provided to a not illustrated controller circuit, and processed accordingly, in a manner similar to that described with reference to FIGS. 2a and 2b.

Figure 9A:
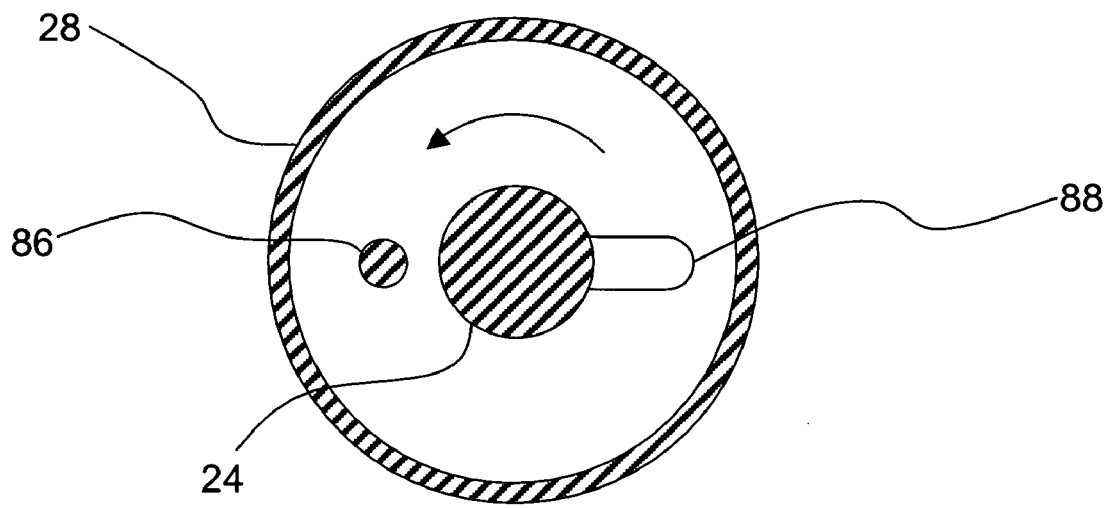
FIG. 9a is a cross-sectional end view of the support post of FIG. 8a, in the first orientation.

Referring now to FIG. 9a, shown is a cross-sectional end view of the support post of FIG. 8a taken along the line 9a-9a. When in the first orientation as shown in FIG. 9a, the cam structure 88 is positioned away from the radiation detector 86, such that radiation that is transmitted from the radiation transmitter 80 impinges upon the radiation detector. Under this condition, the radiation detector 86 registers a radiation intensity maximum.

Figure 9B:
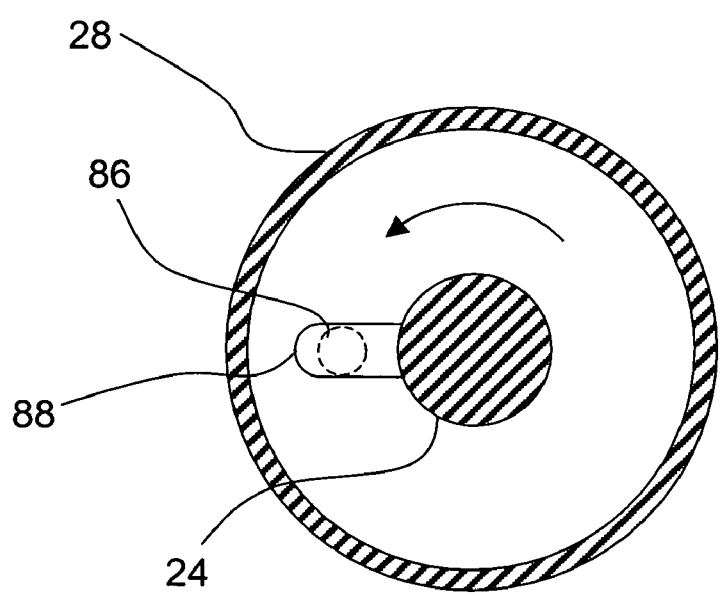
FIG. 9b is a cross-sectional end view of the support post of FIG. 8b, in the second orientation.

Referring now to FIG. 9b, shown is a cross-sectional end view of the support post of FIG. 8b taken along the line 9b-9b. When in the second orientation as shown in FIG. 9b, the cam structure is positioned between the radiation detector 86 and the radiation transmitter 80, such that radiation transmitted from the radiation transmitter is at least partially blocked by the cam structure. Under this condition, the radiation detector registers a low intensity of radiation and provides a signal indicative of a radiation intensity minimum. The signal is provided to a controller circuit in a manner similar to that described with reference to FIG. 2b.

Optionally, the system is automatically self-calibrating. For instance, the control circuit 30 initiates a calibration cycle at predetermined intervals. Calibration optionally occurs after an aircraft moves away from the boarding bridge, or after a predetermined number of aircraft have been serviced, or after a fault is detected, etc. During the calibration cycle, the control circuit 30 positions the boarding bridge away from any nearby obstructions including aircraft and ground service vehicles. Next, the control circuit 30 adjusts the height of the boarding bridge to a known position. By way of example, the boarding bridge is lowered to a limit as defined by a fixed limit switch. Optionally, the current height of the bridge is compared with the known height of the fixed limit switch, and the current height of the bridge is updated when the result of the comparison is outside a predetermined threshold value. Alternatively, the current height of the bridge is reset to the known height of the fixed limit switch during each calibration cycle. Optionally, an upper limit switch is provided at a known height in addition to the lower limit switch. The upper limit switch is used to ensure that calibration is maintained over the full range of vertical movement of the boarding bridge.

Figure 10A:
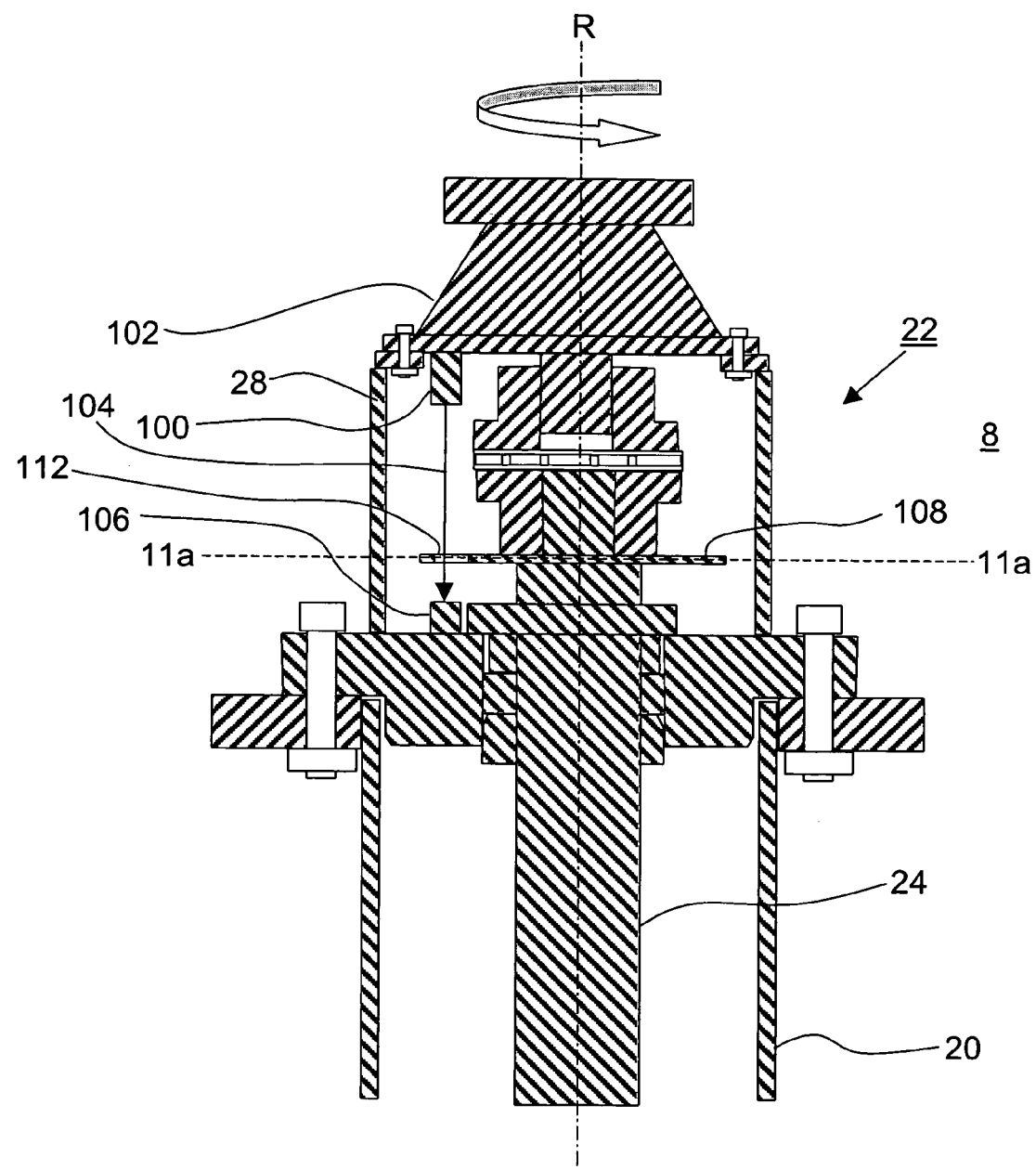
FIG. 10a is a partial cross-sectional side view of a support post, including a radiation transmitter and detector and a rotating-disk structure according to an embodiment of the instant invention, in a first orientation.

Referring now to FIG. 10a, shown is a partial cross-sectional side view of a support post, including an electromagnetic sensor in the form of an electromagnetic radiation transmitter, an electromagnetic detector and a rotating-disk structure, according to an embodiment of the instant invention, in a first orientation. The motor 22 is mounted to the outer tube 20 and is rotationally coupled to an electromechanical screw 24, which is disposed within the support post 8. The motor 22 turns the electromechanical screw 24 about rotational axis R. A radiation transmitter 100 is disposed adjacent to an endcap structure 102 of the housing of motor 22. The electromagnetic radiation transmitter 100 is disposed for launching electromagnetic radiation along an optical path 104 that is parallel to the rotational axis "R." An electromagnetic radiation detector 106 is disposed along optical path 104 for receiving radiation transmitted from the electromagnetic radiation transmitter. Additionally, a rotating disk structure 108 including at least one opening 112 defined therethrough is mounted to a portion of the electromechanical screw 24. The rotating disk structure 108 turns with the electromechanical screw 24 as the tunnel section is being elevated or lowered. In the orientation that is illustrated in FIG. 10a, radiation is transmitted between the electromagnetic radiation transmitter 100 and the electromagnetic radiation detector 106 via the opening 112 of the rotating disk structure, such that the electromagnetic radiation detector 106 registers high radiation intensity. Optionally, the rotating disk structure 108 includes a plurality of openings 112 defined therethrough. For instance, two openings 112 are arranged at 90° one relative to the other around the rotating disk structure 108.

Figure 10B:
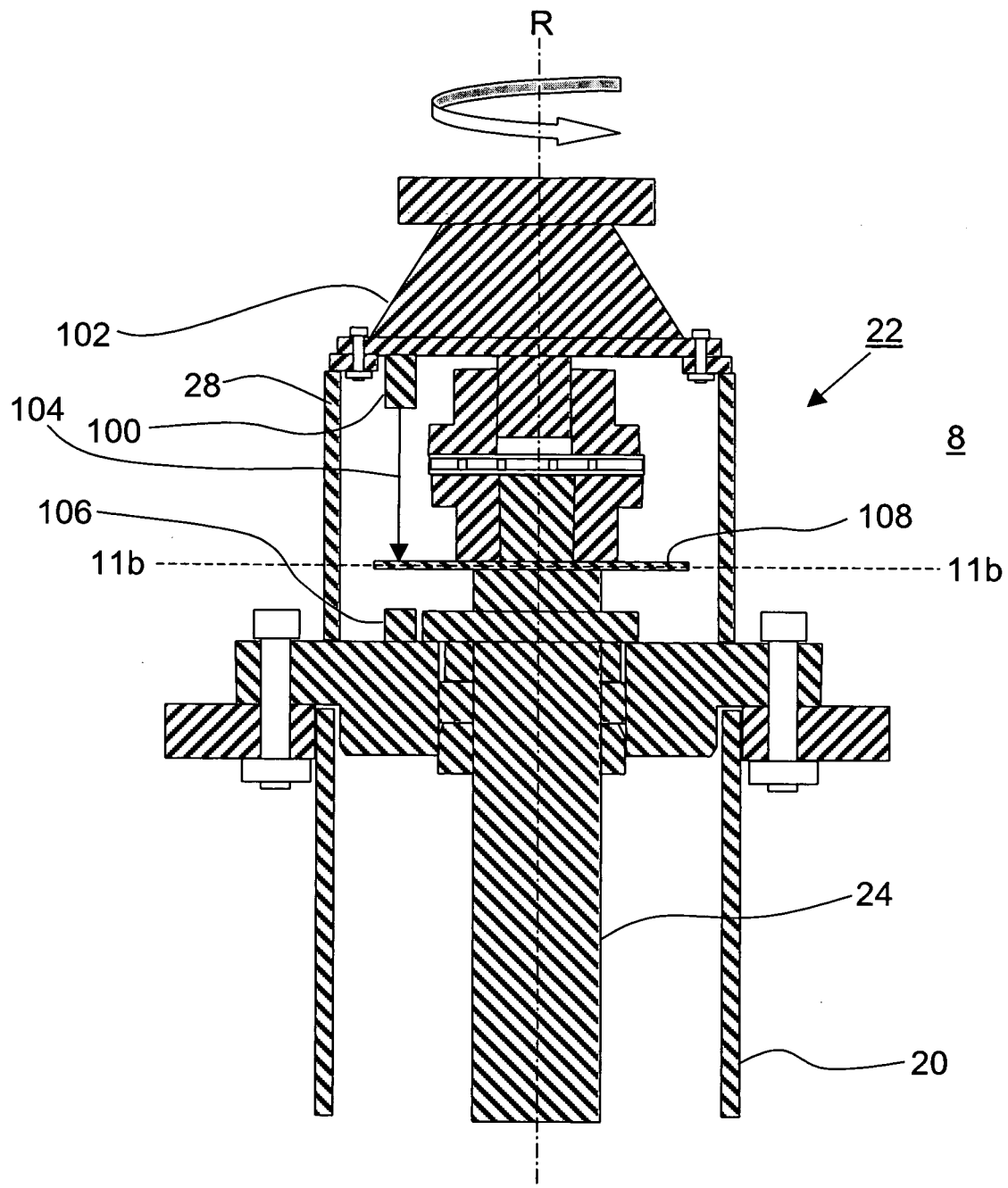
FIG. 10b is a partial cross-sectional side view of a support post, including a radiation transmitter and detector and a rotating-disk structure according to an embodiment of the instant invention, in a second orientation.

Referring now to FIG. 10b, shown is a partial cross-sectional side view of the support post of FIG. 10a, in a second orientation. Rotation of the electromechanical screw 24 about the axis R results in the rotating disk structure 108 turning such that the opening 112 defined therethrough is no longer aligned between the electromagnetic radiation transmitter 100 and the electromagnetic radiation detector 106. Accordingly, the rotating disk structure 108 prevents radiation from being transmitted between the electromagnetic radiation transmitter 100 and the electromagnetic radiation detector 106. In the second orientation, the electromagnetic radiation detector 106 registers low radiation intensity and provides a signal indicative of a radiation intensity minimum. The signal is provided to a controller circuit in a manner similar to that described with reference to FIG. 2b.

Figure 11A:
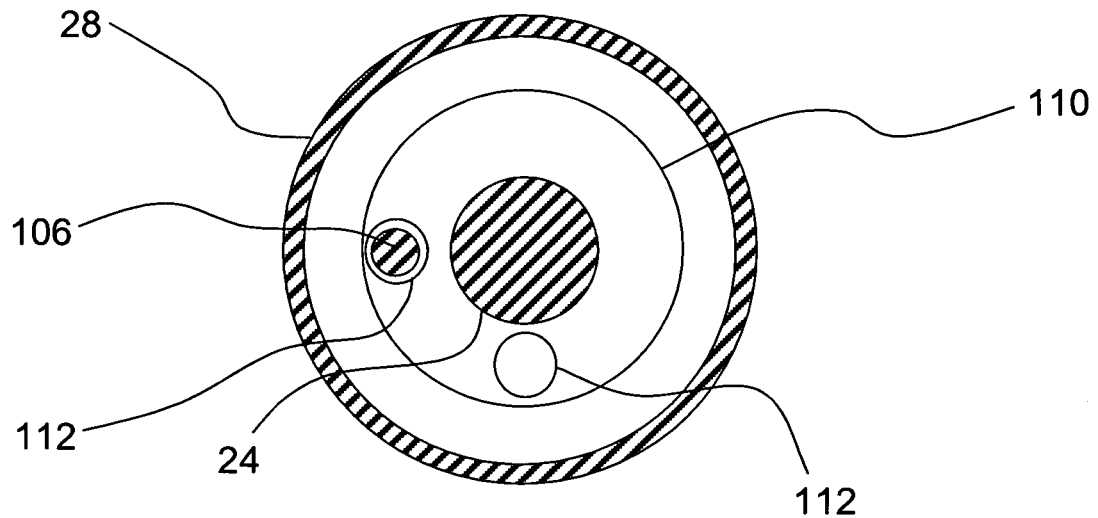
FIG. 11a is a cross-sectional end view of the support post of FIG. 10a, in the first orientation.
Figure 11B:
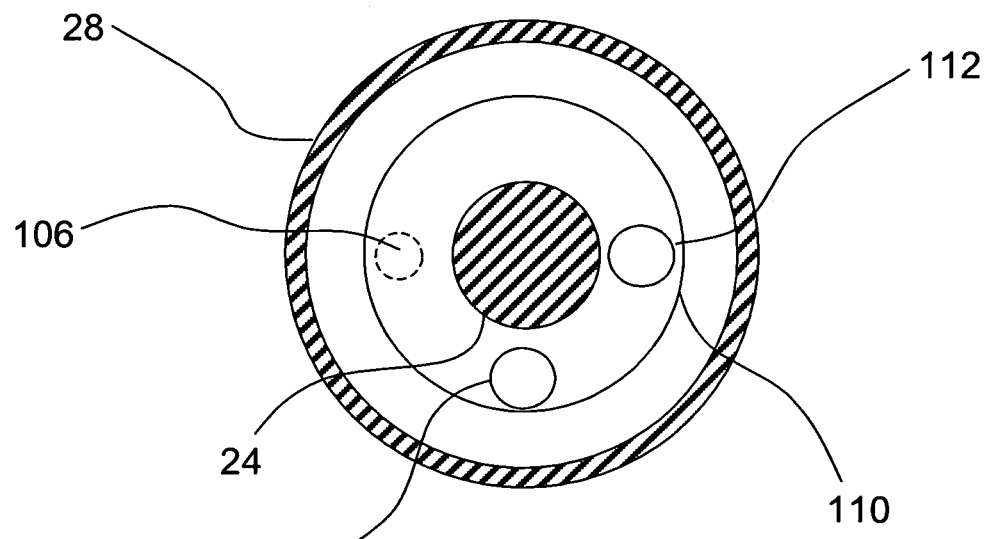
FIG. 11b is a cross-sectional end view of the support post of FIG. 10b, in the second orientation.

Referring now to FIG. 11a, shown is a cross-sectional end view of the support post of FIG. 10a, taken along the line 10a-10a. In FIGS. 11a and 11b, the rotating disk structure 108 having one opening 112 is replaced by rotating disk structure 110 having two openings 112 defined therethrough. When in the first orientation as shown in FIG. 11a, an opening 112 defined through the rotating disk structure 110 is aligned with the electromagnetic radiation detector 106, such that radiation that is transmitted from the electromagnetic radiation transmitter 100 passes through the opening 112 and impinges upon the electromagnetic radiation detector 106. Under this condition, the electromagnetic radiation detector 106 registers a radiation intensity maximum. In the instant example, two openings 112 defined through the rotating disk structure 108 are separated one from the other by 90°. Of course, optionally any number of openings 112 is provided through the rotating disk structure 110, such as for instance three openings 112 separated one from the other by 120°, four openings 112 separated one from the other by 90° etc.

Referring now to FIG. 11b, shown is a cross-sectional end view of the support post of FIG. 10b, taken along the line 10b-10b. When in the second orientation as shown in FIG. 11b, the opening 112 is not aligned with the electromagnetic radiation detector 106 such that radiation transmitted from the electromagnetic radiation transmitter 100 is blocked by the rotating disk structure 110. Under this condition, the radiation detector registers a low intensity of radiation.

Referring now to FIGS. 11a and 11b, each revolution of the electromechanical screw 24 results in two radiation intensity maxima, since in the instant example the rotating disk structure 100 includes two openings 112. The radiation detector 106 provides a signal each time a radiation intensity maximum is registered. The signal is provided to a controller circuit in a manner similar to that described with reference to FIG. 2b.

Optionally, the electromagnetic radiation transmitter 100 launches polychromatic light along the optical path 104. When the two openings 112 are adapted for transmitting different wavelengths of electromagnetic radiation, then it is possible to discern the origin of reflected radiation. By way of a non-limiting example, each opening includes a bandpass filter for transmitting a range of wavelengths of electromagnetic radiation that is unique to each opening. In particular, the first opening passes electromagnetic radiation within a first range of wavelengths, and the second opening disposed at 90° counter-clockwise relative to the first opening passes electromagnetic radiation within a second range of wavelengths. When the time delay between detecting electromagnetic radiation within the first range of wavelengths and detecting electromagnetic radiation within the second range of wavelengths is short compared to the time delay between detecting electromagnetic radiation within the second range of wavelengths and detecting electromagnetic radiation within the first range of wavelength, it is determined that the electromechanical screw is rotating in a clockwise direction. The actual direction of rotation, which is sensed in the manner described above, can then be compared to the expected direction of rotation for a particular bridge movement. When the actual direction of rotation does not agree with the expected direction of rotation it is known that an error has occurred, and that the bridge is moving vertically in the wrong direction. Optionally, a control circuit automatically stops vertical movement of the bridge or corrects vertical movement of the bridge. Further optionally, an alarm sounds when it is determined that the bridge is moving vertically in the wrong direction.

In general terms, a method for determining actual direction of rotation of an electromagnetic screw includes a step of receiving at a first time $t_1$ a first signal that is indicative of a first rotational orientation of the electromechanical screw. A next step includes receiving at a second time $t_2$ a second signal that is indicative of a second rotational orientation of the electromechanical screw. A step of determining a time difference $\Delta t$ between $t_1$ and $t_2$ is performed. Finally, a step of determining the actual direction of rotation is performed. For instance, it is determined that the actual direction of rotation is clockwise when the determined time difference is within a first predetermined range of values, and it is determined that the actual direction of rotation is counter-clockwise when the determined time difference is within a second predetermined range of values. The first predetermined range of values and the second predetermined range of values are determined in dependence upon a current rate of rotation of the electromechanical screw.

Figure 12:
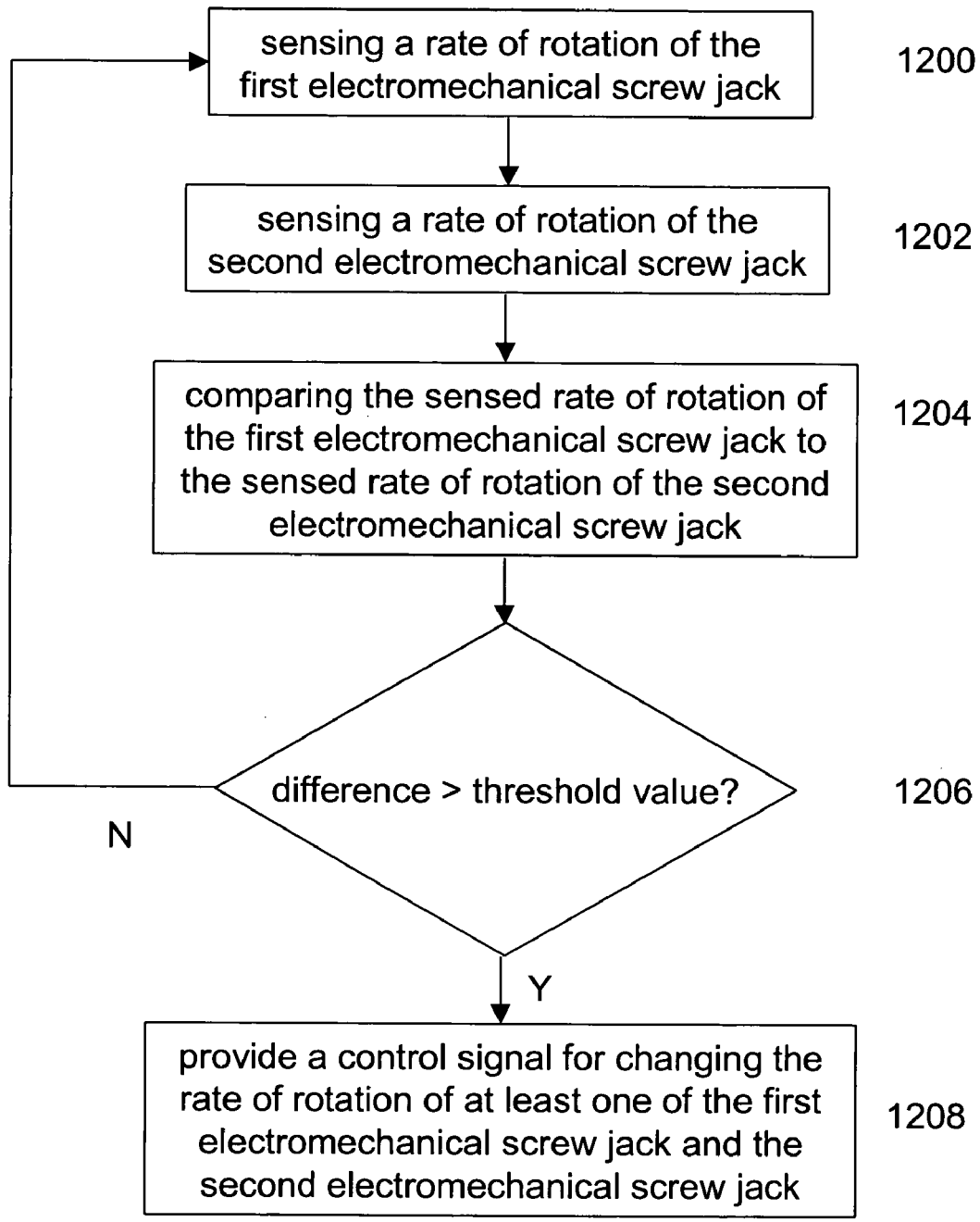
FIG. 12 is a simplified flow diagram of a method for preventing a rack fault condition of a passenger boarding bridge, according to an embodiment of the instant invention.

Referring now to FIG. 12, shown is a simplified flow diagram of a method for preventing a rack fault condition of a passenger boarding bridge, according to an embodiment of the instant invention. In the instant example, the passenger boarding bridge has a first electromechanical screw jack and a second electromechanical screw jack mounted one each adjacent opposite sidewall surfaces thereof. At step 1200 a first sensor, such as for instance an electromagnetic sensor, is used for sensing a rate of rotation of the first electromechanical screw jack. At step 1202 a second sensor, such as for instance a second electromagnetic sensor, is used for sensing a rate of rotation of the second electromechanical screw jack. In one specific and non-limiting example, the rates of rotation of the first and second electromechanical screw jacks are sensed approximately simultaneously. At step 1204 the sensed rate of rotation of the first electromechanical screw jack is compared to the sensed rate of rotation of the second electromechanical screw jack. At decision step 1206, when the comparison is indicative of the sensed rates of rotation differing one from the other by more than a predetermined threshold amount, a control signal is provided at step 1208 for changing the rate of rotation of at least one of the first electromechanical screw jack and the second electromechanical screw jack. If the comparison is indicative of the sensed rates of rotation differing one from the other by less than the predetermined threshold amount, then the method repeats from step 1200.

Figure 13:
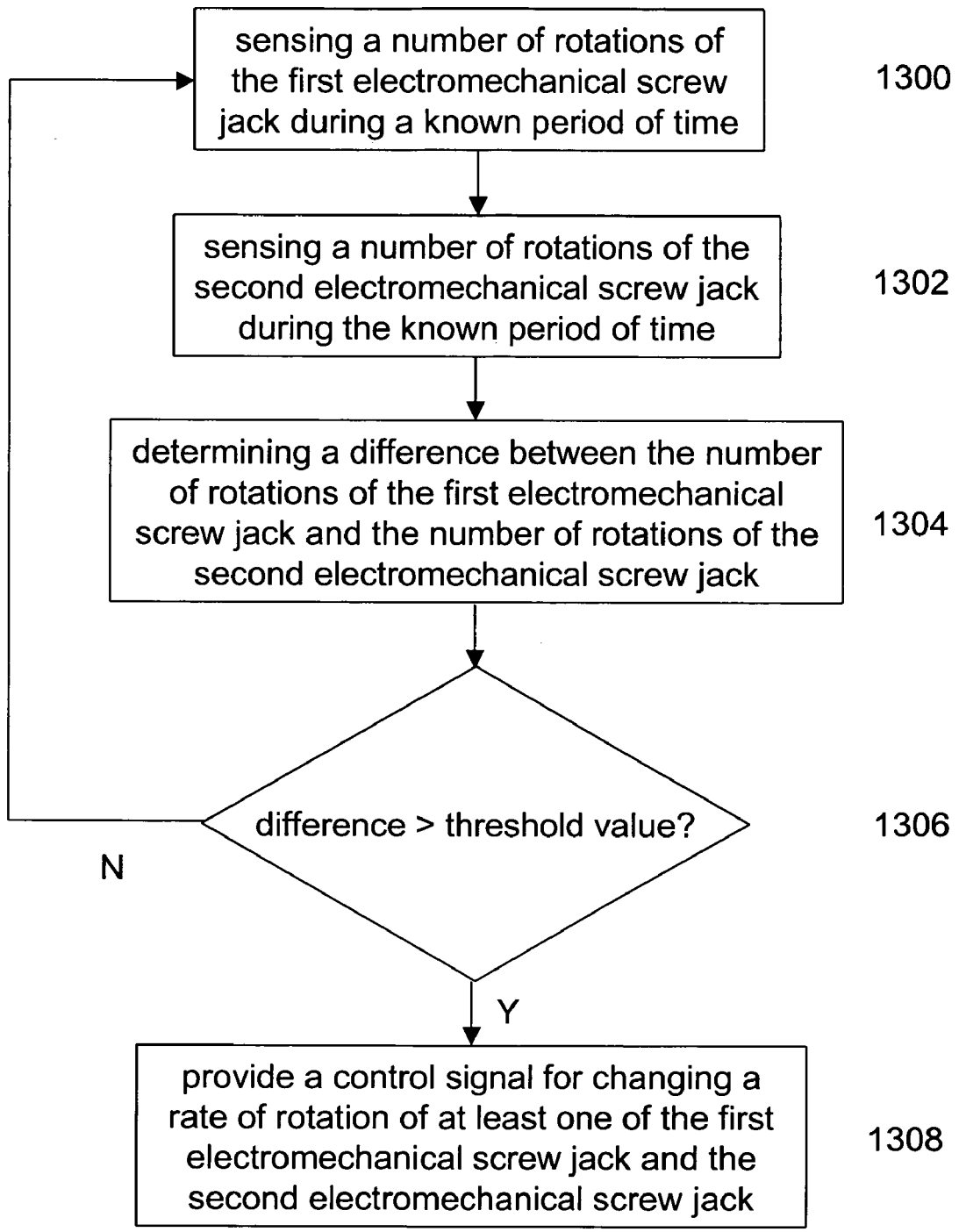
FIG. 13 is a simplified flow diagram of another method for preventing an occurrence of a rack fault condition of a passenger boarding bridge, according to an embodiment of the instant invention; and, FIG. 14 is a simplified flow diagram of another method for preventing an occurrence of a rack fault condition of a passenger boarding bridge, according to an embodiment of the instant invention.

Referring now to FIG. 13, shown is a simplified flow diagram of another method for preventing a rack fault condition of a passenger boarding bridge, according to an embodiment of the instant invention. In the instant example, the passenger boarding bridge has a first electromechanical screw jack and a second electromechanical screw jack mounted one each adjacent opposite sidewall surfaces thereof. At step 1300 a first sensor, such as for instance an electromagnetic sensor, is used for sensing a number of rotations of the first electromechanical screw jack during a known period of time. At step 1302 a second sensor, such as for instance an electromagnetic sensor, is used for sensing a number of rotations of the second electromechanical screw jack during the known period of time. At step 1304 a difference between the number of rotations of the first electromechanical screw jack and the number of rotations of the second electromechanical screw jack during the known period of time is determined. At decision step 1306, when the determined difference is outside a predetermined range of threshold values a control signal is provided at step 1308 for changing a rate of rotation of at least one of the first electromechanical screw jack and the second electromechanical screw jack. When the determined difference is within the predetermined range of threshold values, then the method repeats from step 1300.

Figure 14:
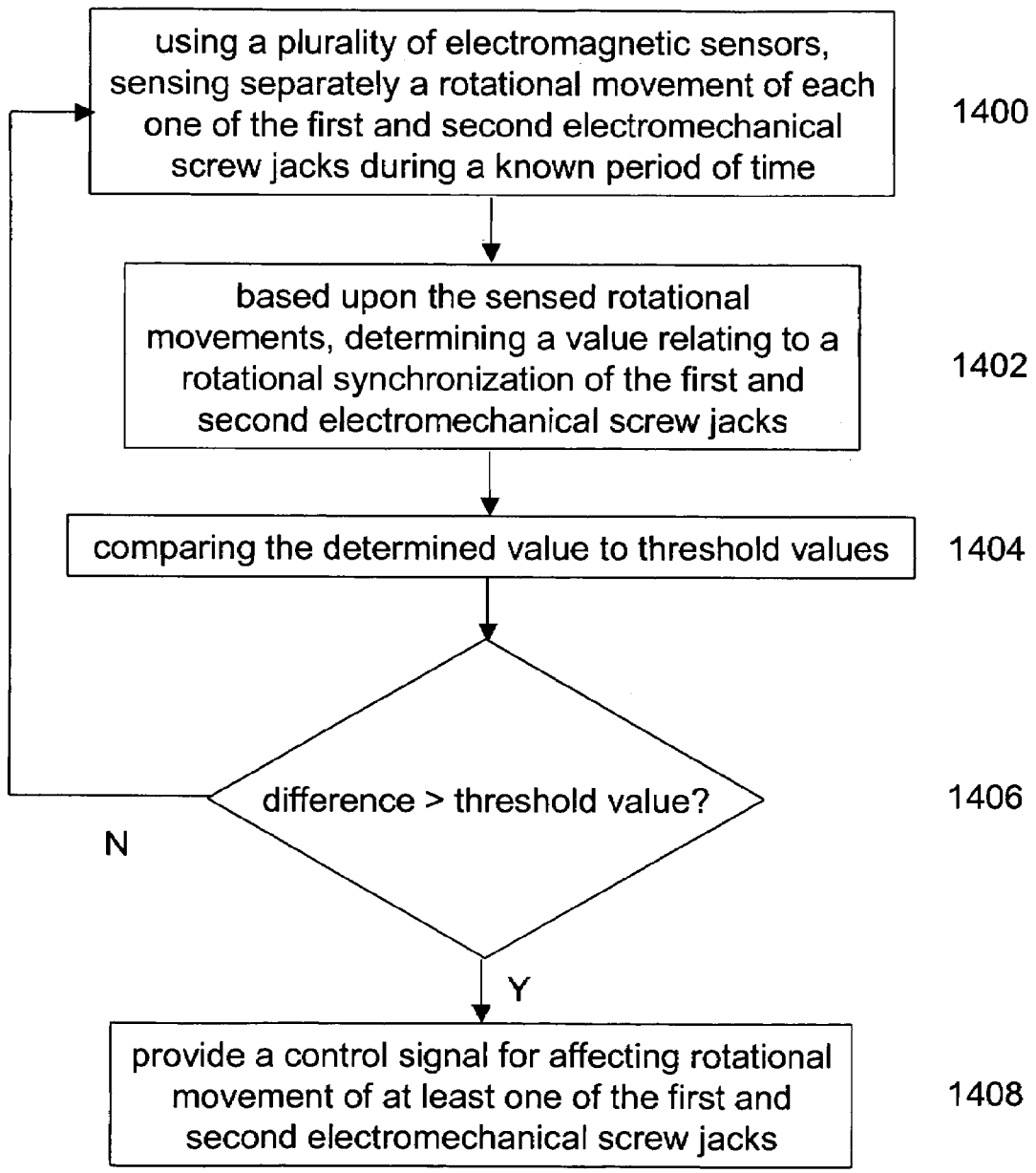

Referring now to FIG. 14, shown is a simplified flow diagram of a method for preventing a rack fault condition of a passenger boarding bridge, according to an embodiment of the instant invention. In the instant example, the passenger boarding bridge has a first electromechanical screw jack and a second electromechanical screw jack mounted one each adjacent opposite sidewall surfaces thereof. At step 1400 a plurality of sensors, such as for instance a plurality of electromagnetic sensors, is used for sensing separately a rotational movement of each one of the first and second electromechanical screw jacks during a known period of time. At step 1402, based upon the sensed rotational movements, a value is determined that relates to a rotational synchronization of the first and second electromechanical screw jacks. At step 1404 the determined value is compared to threshold values. At decision step 1406, when the determined value is outside a predetermined range of threshold values a control signal is provided at step 1408 for affecting rotational movement of at least one of the first and second electromechanical screw jacks. When the determined difference is within the predetermined range of threshold values, then the method repeats from step 1400.

Optionally, the electromagnetic sensors that are used with the methods of FIGS. 12 through 14 are one of proximity sensors and optical sensors. Further optionally, a plurality of electromagnetic sensors are used for sensing rotational movement of each screw jack.

According to an embodiment of the instant invention, a sensor is used to sense a measurable quantity, which is indicative of a developing rack fault condition. For instance, a plurality of electromagnetic sensors is used to sense rotational synchronization of the electromechanical screw jacks adjacent either lateral surface of the passenger boarding bridge, as described above. Alternatively, mechanical limit switches are used to sense the support posts moving out of square as a rack fault condition develops. Optionally, a height difference between the opposite lateral surfaces of the passenger boarding bridge is measured. In any case, it is necessary only that an indication is obtained prior to the movement of passenger boarding bridge seizing in the vertical direction. In particular, detecting an early indication of a developing rack fault condition allows the bridge controller to perform a corrective action and avoid the need to temporarily disable vertical movement of the passenger boarding bridge. Optionally, the indication includes information relating to a rate of advancement of a first electromechanical screw jack relative to a rate of advancement of a second electromechanical screw jack. If the first electromechanical screw jack is advancing relatively faster than the second electromechanical screw jack, then the corrective action includes one of speeding up the rate of rotation of the first electromechanical screw jack, reducing the rate of rotation of the second electromechanical screw jack, and simultaneously speeding up the rate of rotation of the first electromechanical screw jack and reducing the rate of rotation of the second electromechanical screw jack. In effect, a differential between motions of one side of the passenger boarding bridge relative to the other side of the passenger boarding bridge is sensed, and a corrective action is performed based upon the sensed differential. Advantageously, relatively minor corrective actions are performed prior to it becoming necessary to stop entirely the vertical movement of the passenger boarding bridge.

Numerous other embodiments may be envisaged without departing from the spirit and scope of the invention.

What is claimed is:

1. A method for preventing a rack fault condition of a passenger boarding bridge, the passenger boarding bridge having a first electromechanical screw jack and a second electromechanical screw jack mounted one each adjacent opposite sidewall surfaces thereof, the method comprising:
   using a first electromagnetic sensor, sensing a number of rotations of the first electromechanical screw jack during a known period of time;
   using a second electromagnetic sensor, sensing a number of rotations of the second electromechanical screw jack during the known period of time;
   determining a difference between the number of rotations of the first electromechanical screw jack and the number of rotations of the second electromechanical screw jack during the known period of time; and,
   when the determined difference is outside a predetermined range of threshold values, providing a control signal for changing a rate of rotation of at least one of the first electromechanical screw jack and the second electromechanical screw jack.

2. A method according to claim 1, wherein providing a control signal comprises providing the control signal to both the first electromechanical screw jack and the second electromechanical screw jack for stopping rotation of both the first electromechanical screw jack and the second electromechanical screw jack.

3. A method according to claim 1, wherein providing a control signal comprises providing the control signal to the at least one of the first electromechanical screw jack and the second electromechanical screw jack for changing the rate of rotation thereof, such that subsequently the rates of rotation differ one from the other by less than the predetermined threshold amount.

4. A method according to claim 1, wherein the first and second electromagnetic sensors are first and second proximity sensors mounted adjacent the first and second electromechanical screw jacks, respectively, and wherein sensing the number of rotations of the first and second electromechanical screw jacks during the known period of time comprises sensing close approach of a surface of each of the first and second electromechanical screw jacks to the first and second proximity sensors, respectively.

5. A method according to claim 4, comprising providing a first cam structure on the first electromechanical screw jack and providing a second cam structure on the second electromechanical screw jack, wherein the first cam structure includes the surface of the first electromechanical screw jack and the second cam structures includes the surface of the second electromechanical screw jack.

6. A method according to claim 1, wherein the first electromagnetic sensor comprises a first electromagnetic radiation transmitter unit and a first electromagnetic radiation detector unit and the second electromagnetic sensor comprises a second electromagnetic radiation transmitter unit and a second electromagnetic radiation detector unit, and wherein sensing a number of rotations of the first electromechanical screw jack comprises sensing blockage by a portion of the first electromechanical screw jack of an electromagnetic signal transmitted between the first electromagnetic radiation transmitter unit and the first electromagnetic radiation detector unit, and wherein sensing a number of rotations of the second electromechanical screw jack comprises sensing blockage by a portion of the second electromechanical screw jack of an electromagnetic signal transmitted between the second electromagnetic radiation transmitter unit and the second electromagnetic radiation detector unit.

7. A method according to claim 1, wherein the first electromagnetic sensor comprises a first electromagnetic radiation transmitter unit and a first electromagnetic radiation detector unit and the second electromagnetic sensor comprises a second electromagnetic radiation transmitter unit and a second electromagnetic radiation detector unit, and wherein sensing a number of rotations of the first electromechanical screw jack comprises sensing reflection from a surface of the first electromechanical screw jack of an electromagnetic signal transmitted from the first electromagnetic radiation transmitter unit, and wherein sensing a number of rotations of the second electromechanical screw jack comprises sensing reflection from a surface of the second electromechanical screw jack of an electromagnetic signal transmitted from the second electromagnetic radiation transmitter unit.

8. A method for preventing a rack fault condition of a passenger boarding bridge, the passenger boarding bridge having a first electromechanical screw jack and a second electromechanical screw jack mounted one each adjacent opposite sidewall surfaces thereof, the method comprising:
   using a plurality of electromagnetic sensors, sensing separately a rotational movement of each one of the first and second electromechanical screw jacks during a known period of time;
   based upon the sensed rotational movements, determining a value relating to a rotational synchronization of the first and second electromechanical screw jacks;
   comparing the determined value to threshold values; and,
   when the determined value is outside a predetermined range of threshold values, providing a control signal for affecting rotational movement of at least one of the first and second electromechanical screw jacks.

9. A method according to claim 8, wherein providing a control signal comprises providing the control signal to both the first electromechanical screw jack and the second electromechanical screw jack for stopping rotation of both the first electromechanical screw jack and the second electromechanical screw jack.

10. A method according to claim 8, wherein providing a control signal comprises providing the control signal to the at least one of the first electromechanical screw jack and the second electromechanical screw jack for changing a rate of rotation thereof, such that a subsequently determined value relating to a rotational synchronization of the first and second electromechanical screw jacks is within the predetermined range of threshold values.

11. A method according to claim 8, wherein the plurality of electromagnetic sensors includes a first proximity sensor mounted adjacent to the first electromechanical screw jack and second proximity sensor mounted adjacent the second electromechanical screw jack, and wherein sensing the rotational movements of the first and second electromechanical screw jacks comprises sensing close approach of a surface of the first and second electromechanical screw jacks to the first and second proximity sensors, respectively.

12. A method according to claim 11, comprising providing a first cam structure on the first electromechanical screw jack and providing a second cam structure on the second electromechanical screw jack, wherein the first cam structure includes the surface of the first electromechanical screw jack and the second cam structures includes the surface of the second electromechanical screw jack.

13. A method according to claim 8, wherein the plurality of electromagnetic sensors includes a first electromagnetic radiation transmitter unit and a first electromagnetic radiation detector unit and a second electromagnetic radiation transmitter unit and a second electromagnetic radiation detector unit, and wherein sensing rotational movements of the first electromechanical screw jack comprises sensing blockage by a portion of the first electromechanical screw jack of an electromagnetic signal transmitted between the first electromagnetic radiation transmitter unit and the first electromagnetic radiation detector unit, and wherein sensing rotational movements of the second electromechanical screw jack comprises sensing blockage by a portion of the second electromechanical screw jack of an electromagnetic signal transmitted between the second electromagnetic radiation transmitter unit and the second electromagnetic radiation detector unit.

14. A method according to claim 8, wherein the plurality of electromagnetic sensors includes a first electromagnetic radiation transmitter unit and a first electromagnetic radiation detector unit and a second electromagnetic radiation transmitter unit and a second electromagnetic radiation detector unit, and wherein sensing rotational movement of the first electromechanical screw jack comprises sensing reflection from a surface of the first electromechanical screw jack of an electromagnetic signal transmitted from the first electromagnetic radiation transmitter unit, and wherein sensing rotational movement of the second electromechanical screw jack comprises sensing reflection from a surface of the second electromechanical screw jack of an electromagnetic signal transmitted from the second electromagnetic radiation transmitter unit.

15. A system for preventing a rack fault condition of a passenger boarding bridge, the passenger boarding bridge having a first electromechanical screw jack and a second electromechanical screw jack mounted one each adjacent opposite sidewall surfaces thereof, the system comprising:

a plurality of electromagnetic sensors disposed for sensing separately a rotational movement of each one of the first and second electromechanical screw jacks; and, a control circuit in communication with the plurality of electromagnetic sensors for receiving therefrom signals indicative of the sensed rotational movement of each one of the first and second electromechanical screw jacks, for determining a value relating to a rotational synchronization of the first and second electromechanical screw jacks, and for providing a control signal for affecting the rotational movement of at least one of the first and second electromechanical screw jacks when the determined value is outside a predetermined range of threshold values.

16. A system according to claim 15, wherein the plurality of electromagnetic sensors includes a first proximity sensor mounted adjacent to the first electromechanical screw jack and second proximity sensor mounted adjacent the second electromechanical screw jack.

17. A system according to claim 16, wherein the first electromechanical screw jack comprises a first cam structure aligned with the first proximity sensor, and wherein the second electromechanical screw jack comprises a second cam structure aligned with the second proximity sensor.

18. A system according to claim 15, wherein the plurality of electromagnetic sensors includes a first optical sensor mounted adjacent to the first electromechanical screw jack and second optical sensor mounted adjacent the second electromechanical screw jack.

19. A system according to claim 18, wherein the first optical sensor comprises a first electromagnetic radiation transmitter and a first electromagnetic radiation detector, and wherein the second optical sensor comprises a second electromagnetic radiation transmitter and a second electromagnetic radiation detector.

20. A system according to claim 19, wherein the first electromechanical screw jack comprises a first radially extending structure for supporting intermittent communication between the first electromagnetic radiation transmitter and the first electromagnetic radiation detector, and wherein the second electromechanical screw jack comprises a second radially extending structure for supporting intermittent communication between the second electromagnetic radiation transmitter and the second electromagnetic radiation detector.

21. A system according to claim 20, wherein the first radially extending structure is a first disk-shaped structure aligned co-axially with the first electromagnetic screw jack and having an opening defined therethrough, the first disk-shaped structure for supporting optical communication between the first electromagnetic radiation transmitter and the first electromagnetic radiation detector via the opening when in a first orientation, and for preventing optical communication between the first electromagnetic radiation transmitter and the first electromagnetic radiation detector when in a second orientation, and wherein the second radially extending structure is a second disk-shaped structure aligned co-axially with the second electromagnetic screw jack and having an opening defined therethrough, the second disk-shaped structure for supporting optical communication between the second electromagnetic radiation transmitter and the second electromagnetic radiation detector via the opening when in a first orientation, and for preventing optical communication between the second electromagnetic radiation transmitter and the second electromagnetic radiation detector when in a second orientation.

22. A method for preventing a rack fault condition of a passenger boarding bridge, the passenger boarding bridge having a first electromechanical screw jack and a second electromechanical screw jack mounted one each adjacent first and second opposite sidewall surfaces thereof, respectively, the method comprising:

using a sensor, sensing a quantity that is indicative of a differential between vertical motion of the first sidewall surface of the passenger boarding bridge relative to vertical motion of the second sidewall surface of the passenger boarding bridge;

based upon the sensed quantity, determining a corrective action for reducing the differential, the corrective action including changing a rate of rotation of the first electromechanical screw jack to a non-zero value; and, providing a control signal for initiating the corrective action.

23. A method for determining an actual direction of rotation of an electromechanical screw, comprising:

receiving at a first time $t_1$ a first signal that is indicative of a first rotational orientation of the electromechanical screw;

receiving at a second time $t_2$ a second signal that is indicative of a second rotational orientation of the electromechanical screw;

determining a time difference $\Delta t$ between $t_1$ and $t_2$; and, determining that the actual direction of rotation is clockwise when the determined time difference is within a first predetermined range of values, and determining that the actual direction of rotation is counter-clockwise when the determined time difference is within a second predetermined range of values.

24. A method according to claim 23, wherein the first predetermined range of values and the second predetermined range of values are determined in dependence upon a current rate of rotation of the electromechanical screw.

* * * * *